United States Patent
Zhao et al.

(10) Patent No.: US 8,792,888 B2
(45) Date of Patent: Jul. 29, 2014

(54) DUAL NETWORK MOBILE DEVICE RADIO RESOURCE MANAGEMENT

(75) Inventors: Wen Zhao, San Jose, CA (US); Syed A. Mujtaba, Santa Clara, CA (US); Xiaowen Wang, Cupertino, CA (US); Vinay R. Majjigi, Sunnyvale, CA (US); Isabel G. Mahe, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 13/416,286

(22) Filed: Mar. 9, 2012

(65) Prior Publication Data

US 2012/0270545 A1  Oct. 25, 2012

Related U.S. Application Data

(60) Provisional application No. 61/478,922, filed on Apr. 25, 2011.

(51) Int. Cl.
*H04W 60/00* (2009.01)

(52) U.S. Cl.
USPC .......................................... 455/435.1; 370/230

(58) Field of Classification Search
CPC ...... H04W 28/04; H04W 72/00; H04W 72/04
USPC ................. 455/435.1, 436; 370/230, 388, 335
See application file for complete search history.

(56) References Cited

U.S. PATENT DOCUMENTS

| | | | |
|---|---|---|---|
| 6,937,861 B2 | 8/2005 | Vanghi | |
| 7,502,345 B2 | 3/2009 | Aaltonen | |
| 2002/0001291 A1* | 1/2002 | Willars et al. | 370/329 |
| 2006/0209801 A1 | 9/2006 | Joshi et al. | |
| 2009/0059826 A1 | 3/2009 | Zhao et al. | |
| 2009/0156257 A1 | 6/2009 | Shi | |
| 2009/0280812 A1* | 11/2009 | Cheng et al. | 455/436 |
| 2010/0112975 A1 | 5/2010 | Sennett et al. | |
| 2010/0329210 A1 | 12/2010 | Shirota et al. | |
| 2011/0096706 A1 | 4/2011 | Ramasamy et al. | |

OTHER PUBLICATIONS

International Search Report for Int'l Application No. PCT/US123265 dated Jul. 6, 2012.
Written Opinion of the International Searching Authority dated Jul. 6, 2012.

* cited by examiner

*Primary Examiner* — Phuoc H Doan
(74) *Attorney, Agent, or Firm* — Womble Carlyle Sandridge & Rice LLP

(57) ABSTRACT

A single chip mobile wireless device capable of receiving and transmitting over one wireless network at a time maintains registration on two wireless communication networks that each use different communication protocols in parallel. Periodically, the mobile wireless device tunes one or more receivers from a first wireless network to a second wireless network in order to listen for paging messages addressed to the mobile wireless device from the second wireless network. The first wireless network suspends allocation of radio resources to the mobile wireless device based on receipt of a suspension message from the mobile wireless device, or based on knowledge of a paging cycle for mobile wireless device in the second wireless network, or based on detection of an out of synchronization condition with the mobile wireless device.

25 Claims, 14 Drawing Sheets

DUAL NETWORK MOBILE DEVICE RADIO RESOURCE MANAGEMENT

CROSS-REFERENCE TO RELATED APPLICATIONS

This application claims the benefit of U.S. Provisional Application No. 61/478,922, filed Apr. 25, 2011, and entitled "DUAL NETWORK MOBILE DEVICE RADIO RESOURCE MANAGEMENT," and which is incorporated by reference herein in its entirety for all purposes.

TECHNICAL FIELD

The described embodiments generally relate to methods and apparatuses for managing radio resources and connections between mobile wireless devices and one or more wireless networks. More particularly, the present embodiments describe radio resource management between a mobile wireless device that supports multiple wireless communication technologies and one or more wireless networks.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. A representative wireless network can include simultaneous support for the Third Generation Partnership Project (3GPP) Long Term Evolution (LTE) wireless communication protocol and the Third Generation Partnership Project 2 (3GPP2) CDMA2000 1x (also referred to as 1xRTT or 1x) wireless communication protocol. This representative "simultaneous" wireless network can support circuit switched voice connections through a first wireless network that uses the CDMA2000 1x wireless communication protocol and packet switched connections (voice or data) through a second wireless network that uses the LTE wireless communication protocol. The 3GPP wireless communications standards organization develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 wireless communications standards organization develops mobile communication standards that include CDMA2000 1xRTT and 1xEV-DO standards. While a dual network mobile wireless device that includes support for both CDMA2000 1x and LTE is described as a representative device herein, the same teachings can be applied to other mobile wireless devices that can operate in dual (or more generally multiple) wireless communication technology networks.

Dual chip mobile wireless devices can include separate signal processing chips that each can support a different wireless communication protocol, such as one signal processing chip for the CDMA2000 1x wireless network and another signal processing chip for the LTE wireless network. In particular, in a dual chip mobile wireless device, each signal processing chip can include its own receive signal processing chain, including in some instances multiple receive antennas and attendant signal processing blocks for each signal processing chip. With separate receive antennas available to each signal processing chip in the dual chip mobile wireless device, pages can be received independently from two different wireless networks, such as from the CDMA2000 1x wireless network and from the LTE wireless network, by the dual chip mobile wireless device. Even when the dual chip mobile wireless device is connected and actively transferring data through one of the signal processing chips to one of the wireless networks, such as the LTE wireless network, the dual chip mobile wireless device can also listen for and receive a paging message through the other parallel signal processing chip from a second wireless network, such as the CDMA2000 1x wireless network. Thus, the dual chip mobile wireless device can establish a device originating or device terminated circuit switched voice connection through the CDMA2000 1x wireless network while also being actively connected to (or simultaneously camped on) the packet switched LTE wireless network. Dual chip mobile wireless devices, however, can consume more power, can require a larger physical form factor and can require additional components (and cost more) than a more integrated "single chip" mobile wireless device.

A single chip mobile wireless device, at least in some configurations, can include a signal processing chip that can support different wireless communications protocols but can be unable to be actively connected to one wireless network and to receive communication from a separate wireless network simultaneously. The single chip mobile wireless device can support multiple wireless communication technologies, such as connections to a CDMA2000 1x wireless network or to an LTE wireless network, but only to one wireless network at any given time. The single chip mobile wireless device can be limited to receiving signals that use one wireless communication technology type at a time, particularly when multiple antennas are used to receive signals for a single communication technology using receive diversity. In a representative embodiment, a single chip mobile wireless device can be able to connect to or camp on an evolved Universal Mobile Telecommunications System (UMTS) Terrestrial Radio Access Network (eUTRAN) of the LTE wireless network and also to connect to or camp on a radio access network (RAN) of the CDMA2000 1x wireless network, but not to both wireless networks simultaneously. The single chip mobile wireless device can be registered on both the LTE wireless network and on the CDMA2000 1x wireless network and can therefore form connections with each wireless network singly but not simultaneously. When the LTE wireless network does not support a circuit switched fall back (CSFB) mode or voice over LTE connections, the single chip mobile wireless device can be unable to receive a page from the CDMA2000 1x wireless network when connected to or camped on the eUTRAN of the LTE wireless network. Thus, there exists a need for a method whereby a single chip mobile wireless device can achieve similar functionality to a dual chip mobile wireless device, so that the single chip mobile wireless device can retain the ability to complete a circuit switched voice connection through the CDMA2000 1x wireless network when connected to or camped on the eUTRAN of a parallel LTE wireless network.

This application describes methods by which a single chip mobile wireless device can operate in a multiple network environment supporting connections to both an LTE wireless network and a CDMA2000 1x wireless network while optimizing radio network resources and minimizing radio network signaling requirements.

SUMMARY OF THE DESCRIBED EMBODIMENTS

Broadly speaking, the described embodiments relate to managing radio resources and connections between mobile wireless devices and one or more wireless networks. More specifically, methods, apparatus and computer readable media are described that manage use of radio network resources while minimizing radio network signaling requirements for a single chip mobile wireless device that can operate in a multiple network environment.

In an embodiment, a method to manage radio resources between a mobile wireless device and a first wireless network is described. The method includes at least the following steps executed by the mobile wireless device when the mobile wireless device is associated with the first wireless network through an established radio resource control connection and is simultaneously registered with a second wireless network. The mobile wireless device transmits a radio resource suspension trigger to the first wireless network while maintaining the established radio resource control connection. After transmitting the radio resource suspension trigger, the mobile wireless device tunes one or more receivers in the mobile wireless device to listen for a paging message from the second wireless network during a paging interval. When receiving a paging message that includes a page addressed to the mobile wireless device from the second wireless network, the mobile wireless device establishes a connection with the second wireless network. When receiving no paging message and when receiving a paging message that does not include a page addressed to the mobile wireless device from the second wireless network, the mobile wireless device tunes the one or more receivers in the mobile wireless device back to the first wireless network and subsequently transmits a signaling message to the first wireless network through the established radio resource connection. In a representative embodiment, the first wireless network suspends all transmit and receive radio resource allocations to the mobile wireless device after receiving the radio resource suspension trigger and continues the suspension until receiving the subsequently transmitted signaling message from the mobile wireless device, while also maintaining the established radio resource control connection with the mobile wireless device.

In another embodiment, a method to manage radio resources between a mobile wireless device and a first wireless network is described. The method includes at least the following steps executed by a radio access subsystem in the first wireless network when the mobile wireless device is associated with the first wireless network through an established radio resource control connection and is simultaneously registered with a second wireless network. The radio access subsystem receives a radio resource suspension trigger from the mobile wireless device. After receiving the radio resource suspension trigger, the radio access subsystem maintains the established radio resource control connection and suspends all transmit and receive radio resource allocations to the mobile wireless device during at least one paging cycle of the second wireless network. After receiving a subsequent signaling message from the mobile wireless device through the established radio resource control connection, the radio access subsystem resumes transmit and receive radio resource allocations to the mobile wireless device. In a representative embodiment, the radio resource suspension trigger is a signaling message that includes a predefined combination of values for a channel quality indicator, a precoding matrix indicator and a rank indicator.

In another embodiment, a method to manage radio resources between a mobile wireless device and a first wireless network is described. The method includes at least the following steps executed by a radio access subsystem in the first wireless network when the mobile wireless device is associated with the first wireless network through an established radio resource control connection and is simultaneously registered with a second wireless network. The radio access subsystem detects that the mobile wireless device is a single chip dual standby mobile wireless device. The radio access subsystem calculates a paging cycle for the mobile wireless device in the second wireless network. During at least one paging cycle for the mobile wireless device in the second wireless network, the radio access subsystem maintains the established radio resource control connection and suspends all transmit and receive radio resource allocations to the mobile wireless device. After receiving a subsequent signaling message from the mobile wireless device through the established radio resource control connection, the radio access subsystem resumes transmit and receive radio resource allocations to the mobile wireless device. In a representative embodiment, the radio access subsystem calculates the paging cycle of the second wireless network using a local time reference, wherein the first and second wireless networks are synchronized to a common time reference. In a representative embodiment, the radio access subsystem detects the mobile wireless device is a single chip dual standby device by a unique international mobile equipment identifier (IMEI) of the mobile wireless device.

In a further embodiment, a method to manage radio resources between a mobile wireless device and a first wireless network is described. The method includes at least the following steps executed by the mobile wireless device when the mobile wireless device is associated with the first wireless network through an established radio resource control connection and is simultaneously registered with a second wireless network. The mobile wireless device tunes one or more receivers in the mobile wireless device to listen for a page address to the mobile wireless device from the second wireless network during a paging interval. When not receiving the page addressed to the mobile wireless device from the second wireless network, the mobile wireless device tunes the one or more receivers in the mobile wireless device to the first wireless network until a subsequent paging interval. When receiving the page addressed to the mobile wireless device from the second wireless network, the mobile wireless device transmits a signaling message to the first wireless network that requests releasing the radio resource control connection, and subsequently the mobile wireless device establishes a connection with the second wireless network.

In yet another embodiment, a mobile wireless device is described. The mobile wireless device includes at least an application processor, a transmitter and one or more receivers. The application processor is configured to control establishing and releasing connections between the mobile wireless device and one or more wireless networks. The transmitter is configured to transmit signals to a first wireless network according to a first wireless communication protocol and to a second wireless network according to a second wireless communication protocol. The one or more receivers are configured to receive signals from the first and second wireless networks. The application processor is further configured to maintain an established radio resource control connection when the transmitter transmits a radio resource suspension trigger to the first wireless network and at least one receiver tunes to a second wireless network to listen for a page addressed to the mobile wireless device during a paging interval. The application processor is also configured to establish a connection with the second wireless network, when receiving the page addressed to the mobile wireless device from the second wireless network during the paging interval. The application processor is additionally configured to send a signaling message to the first wireless network through the established radio resource control connection after at least one receiver tunes back to the first wireless network, when not receiving the page from the second wireless network during the paging interval. In a representative embodiment, the radio resource suspension trigger is a signaling message that includes a predefined combination of values for a channel quality indicator, a precoding matrix indicator and a rank indicator.

In another embodiment, a computer program product encoded as computer program code in a non-transitory computer readable medium for managing radio resources between a mobile wireless device and a first wireless network is described. The computer program product includes at least the following computer program code. Computer program code for maintaining an established radio resource control connection with the first wireless network when listening for a page addressed to the mobile wireless device from a second wireless network during a paging interval. Computer program code for tuning one or more receivers in the mobile wireless device to listen for the page addressed to the mobile wireless device from the second wireless network during the paging interval. Computer program code for tuning the one or more receivers in the mobile wireless device to the first wireless network when not receiving the page addressed to the mobile wireless device from the second wireless network during the paging interval until a subsequent paging interval. Computer program code for transmitting a signaling message that requests release of the radio resource control connection to the first wireless network after receiving the page addressed to the mobile wireless device from the second wireless network and before establishing a connection with the second wireless network.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
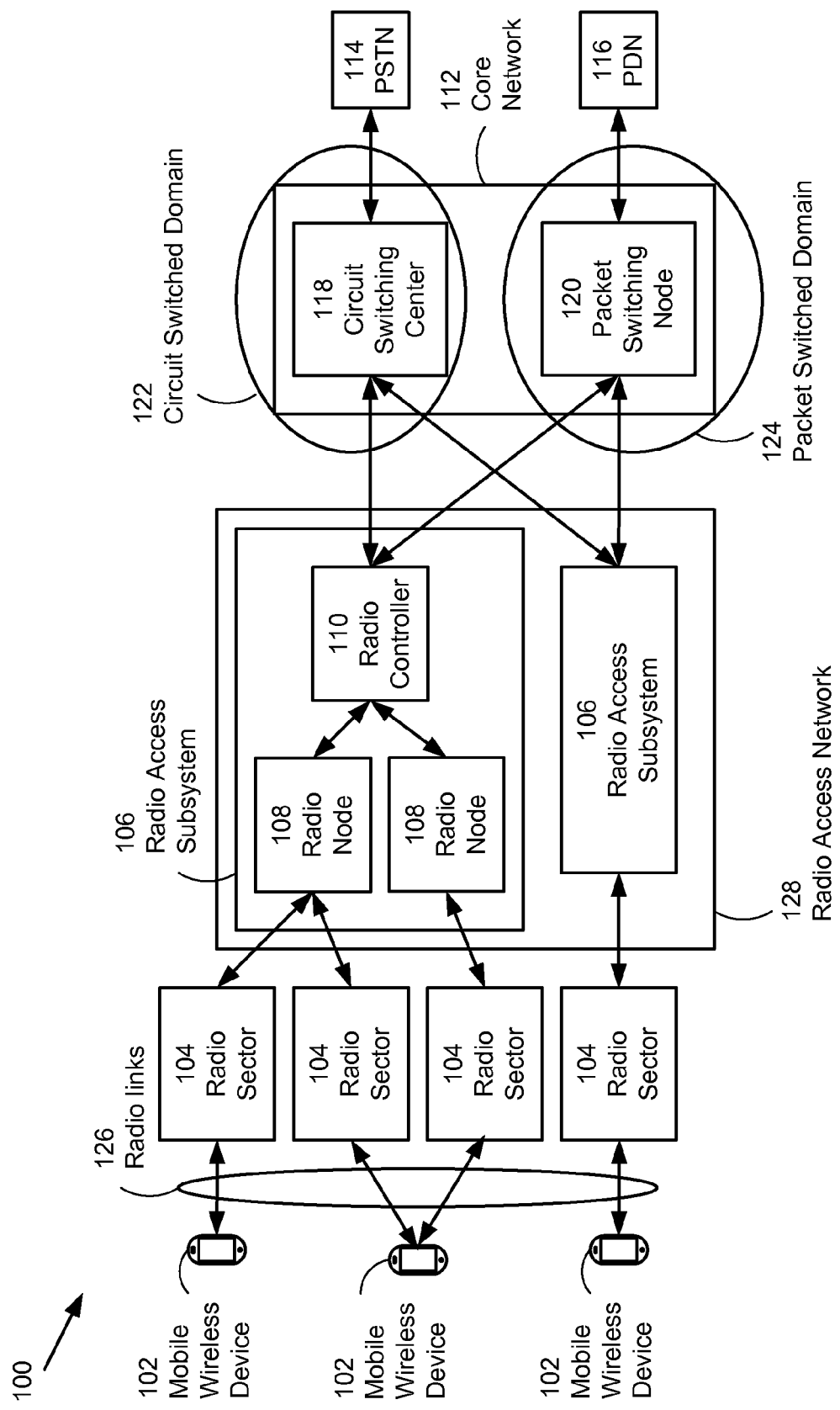
FIG. 1 illustrates components of a generic wireless communication network.

Wireless networks continue to evolve as network operators deploy equipment for new wireless communication technologies based on ongoing standardization efforts. Mobile wireless devices can provide capabilities to communicate with wireless networks based on two or more different wireless communication technologies, e.g. GSM and UMTS, UMTS and LTE, CDMA2000 1x and LTE, as newer wireless network technologies offer advanced capabilities in parallel with earlier wireless network technologies that can provide greater geographic area coverage. Different wireless communication technologies can require different hardware and software processing to transmit and receive wireless signals, and a mobile wireless device can includes multiple, separate signal processing chips to encode and decode wireless signals according to the different wireless communication technologies. A dual chip mobile wireless device, for example, can include one chip for a CDMA2000 1x wireless network and a second chip for an LTE wireless network. With sufficient parallel analog hardware, the dual chip mobile wireless device can communicate with one or both of the wireless networks in parallel. Dual chip mobile wireless devices, however, can be more complex, larger, more costly and more power intensive than a single chip mobile wireless device. In some embodiments, the single chip mobile wireless device can communicate with one wireless network at a time out of multiple wireless networks and can provide limited (if any) simultaneous connection capabilities for other parallel wireless networks.

It should be understood that implementations of the same methods and apparatuses described herein can apply to mobile wireless devices that operate in different types of wireless networks, particularly one or more wireless networks that offer connections using two or more different generations or types of wireless communication protocols. For example, the same teachings can be applied to a combination of GSM and UMTS networks, LTE and UMTS networks, LTE and CDMA2000 1x networks or other "combined" multiple radio access technology (multi-RAT) wireless networks. The specific examples and implementations described herein are presented for simplicity in relation to CDMA2000 1x-RTT and LTE wireless networks but can also apply equally to other wireless network environments that use other combinations of wireless access communication protocols.

In embodiments described herein, a single chip mobile wireless device can be capable of receiving wireless radio frequency signals from an LTE wireless network or from a CDMA2000 1x wireless network individually but not from both wireless networks simultaneously (or in some instances, with only limited reception capabilities from both wireless networks simultaneously). Initially, the single chip mobile wireless device can be associated with the LTE wireless network, e.g. connected to or camped on the LTE wireless network. The single chip mobile wireless device can be registered simultaneously with both the LTE wireless network and with the CDMA2000 1x wireless network. The CDMA2000 1x wireless network can seek to establish a connection with the single chip mobile wireless device by sending a paging message including a page addressed to the mobile wireless device during a paging interval. The single chip mobile wireless device can interrupt a packet switched data connection with the LTE wireless network in order to realize a mobile originated voice connection or to listen for a page addressed to the mobile wireless device for a mobile terminated circuit switched voice connection to the CDMA2000 1x wireless network. The single chip mobile wireless device can suspend the packet switched data connection to the LTE wireless network in order to establish a device originating or device terminated circuit switched voice connection to the CDMA2000 1x wireless network; however, a higher layer radio resource connection, such as a connection for signaling between the single chip mobile wireless device and the LTE wireless network, can remain undisturbed during the suspension. In an embodiment, the single chip mobile wireless device can transmit a radio resource suspension trigger to the LTE wireless network to indicate to the LTE wireless network to suspend radio resource allocation during at least one paging interval while still maintaining an established radio resource control signaling connection with the single chip mobile wireless device. The single chip mobile wireless device can tune a receiver away from the LTE wireless network and to the CDMA2000 1x wireless network to listen for a paging message that includes a page addressed to the single chip mobile wireless device. If no paging message including a page addressed to the single chip mobile wireless device is received from the CDMA2000 1x wireless network, then the single chip mobile wireless device can retune the receiver back to the LTE wireless network in a relatively short time period, e.g. within approximately 100 ms. A short interruption of the packet switched data connection (and of a parallel higher layer signaling connection) to the LTE wireless network can be accommodated without the LTE wireless connection being dropped. In a representative embodiment, the single chip mobile wireless device can transmit a signaling message on the radio resource control signaling connection to the LTE wireless network indicating that the single chip mobile wireless device is ready for a resumption of radio resource allocations to the single chip mobile wireless device. Active data transfer between the LTE wireless network and the single chip mobile wireless device during the suspension period could have been lost during the short interruption to listen for the page addressed to the single chip mobile wireless device on the CDMA2000 1x wireless network during the paging interval if data transfer between the single chip mobile wireless device and the LTE wireless network had not been suspended.

After receiving a page addressed to the single chip mobile wireless device from the CDMA2000 1x wireless network, the single chip mobile wireless device can establish a voice connection with the CDMA2000 1x wireless network. The voice connection between the single chip mobile wireless device and the CDMA2000 1x wireless network can result in a long interruption to data traffic and signaling traffic between the single chip mobile wireless device and the LTE wireless network. Downlink and uplink radio resources assigned by the LTE wireless network to the single chip mobile wireless device can remain unused during this long interruption if not suspended beforehand, which can unnecessarily waste scarce radio resources in the access network portion of the LTE wireless network. A radio resource control (RRC) connection to the LTE wireless network can eventually time out due to a lack of acknowledgements being sent from the single chip mobile wireless device to the LTE wireless network. The RRC connection can enter the idle state, or the connection between the single chip mobile wireless device and the LTE wireless network can be dropped. When retuning the receiver back to the LTE wireless network, the single chip mobile wireless device can be required to re-establish a new RRC connection with the LTE wireless network.

In order to listen for pages addressed to the single chip mobile wireless device from the CDMA2000 1x wireless network, the single chip mobile wireless device can tune a receiver to the CDMA2000 1x wireless network during regular paging intervals. In an embodiment, a CDMA2000 1x wireless network can operate with a paging cycle of approximately 5.12 seconds. The single chip mobile wireless device can be aware of a connection request from the CDMA2000 1x wireless network by listening for and receiving paging messages containing pages addressed to the single chip mobile wireless device transmitted by the CDMA2000 1x wireless network during appropriate paging intervals. The 3GPPP communications standards document 23.272 Release 9 includes an extended service request (ESR) message to terminate a connection with the LTE wireless network before listening to (or connecting to) a parallel CDMA2000 1x wireless network. Before tuning its receiver to the CDMA2000 1x wireless network, a mobile wireless device can send the ESR message to the LTE wireless network, thereby releasing LTE radio resources assigned to the mobile wireless device and also terminating the LTE RRC signaling connection. Sending the ESR message and subsequently tuning to the CDMA2000 1x wireless network can be used effectively for mobile originated voice connections to the CDMA2000 1x wireless network, particularly as voice connections can last for relatively long periods of time. For short time intervals, such as when tuning a receiver in a single chip mobile wireless device to listen for paging messages during a relatively short time periods spanning approximately 100 ms, with each short time period spaced apart at regular time intervals, sending an ESR message before each tuning of the receiver to listen for pages from the parallel CDMA2000 1x wireless network can place an unnecessarily high signaling load on the LTE wireless network. The RRC signaling connection to the LTE wireless network can be repeatedly released by sending an ESR message for each paging interval to listen for a page and then re-established when receiving no page addressed to the single chip mobile wireless device during the paging interval. In most instances, pages addressed to the single chip mobile wireless device can be received much less frequently than the frequency that the paging intervals can occur. Scarce signaling radio resources can be wasted by the repeated releasing and re-establishing of the RRC signaling connection with the LTE wireless network. Sending an ESR message only after receiving a page addressed to the single chip mobile wireless device can reduce signaling loads on the LTE wireless network, thereby improving signaling efficiency in the radio access portion of the LTE wireless network. In different embodiments, when to transmit the ESR message to release the RRC connection with the LTE wireless network can be balanced against time to respond to the page addressed to the single chip wireless device in order to establish a connection with the CDMA2000 1x wireless network as described further herein.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the mobile wireless device 102 can connect by one or more radio links 126. To form a mobile terminated connection between the mobile wireless device 102 and the radio access network 128, a radio controller 110 in the radio access subsystem 106 can instruct the radio node 108 to transmit a signaling message, such as a paging message containing a page addressed to the mobile wireless device 102. In certain networks, the radio controller 110 can also instruct the radio node 108 to transmit a signaling indicator, such as a page indicator bit, in advance of the paging message to provide notice to the mobile wireless device 102 of the forthcoming page. After receiving the page, the mobile wireless device 102 can attempt to establish an active connection with the wireless network 100 by sending a connection request message on a radio frequency channel. (The connection request can be bundled together with other information into a common message and need not be a distinct connection request message alone.)

In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

Radio resources that form the radio links 126 in the radio sectors 104 can be shared using a number of different multiplexing techniques, including time division, frequency division, code division, space division and combinations thereof. A radio resource control (RRC) signaling connection can be used to communicate between the mobile wireless device 102 and the radio controller 110 in the radio access subsystem 106 of the radio access network 128 including requests for and dynamic allocations of radio resources to multiple mobile wireless devices 102. Suspension of allocation of radio resources to a mobile wireless device 102 can occur without disestablishing the radio resource signaling connection to the mobile wireless device 102 as described further herein.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
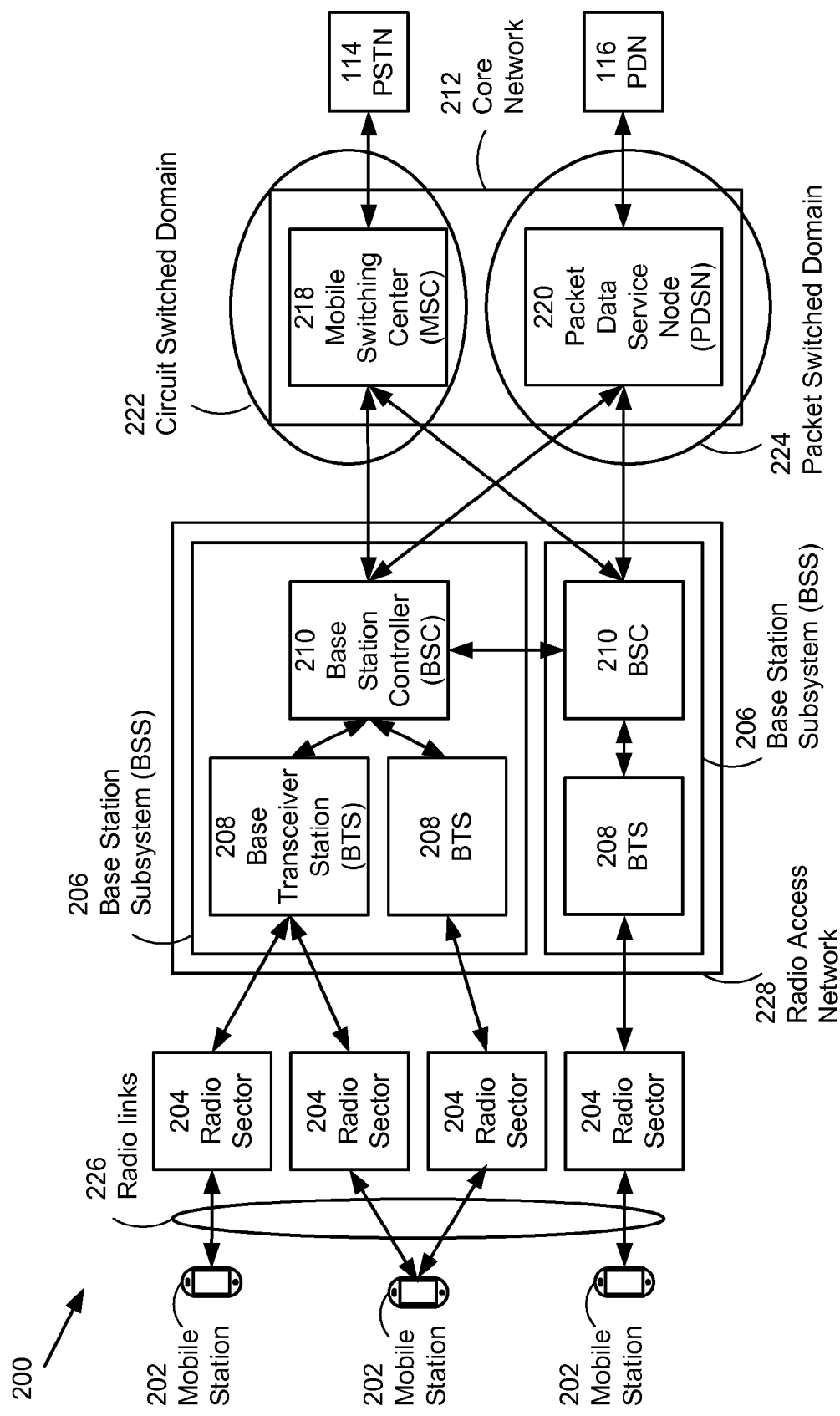
FIG. 2 illustrates components of a CDMA2000 1x (RTT or EV-DO) wireless communication network.

FIG. 2 illustrates a representative CDMA2000 1x wireless network 200 that can include elements comparable to those described for the generic wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Establishing connections on the CDMA2000 1x wireless network 200 can depend on the mobile station 202 receiving a page from the BSS 206 indicating an incoming connection. The mobile station 202 can be required to listen for pages during specific paging intervals. Without reception of the page, the mobile station 202 can be unaware of a request to form a connection between the mobile station 202 and the CDMA2000 1x wireless network 200.

Figure 3:
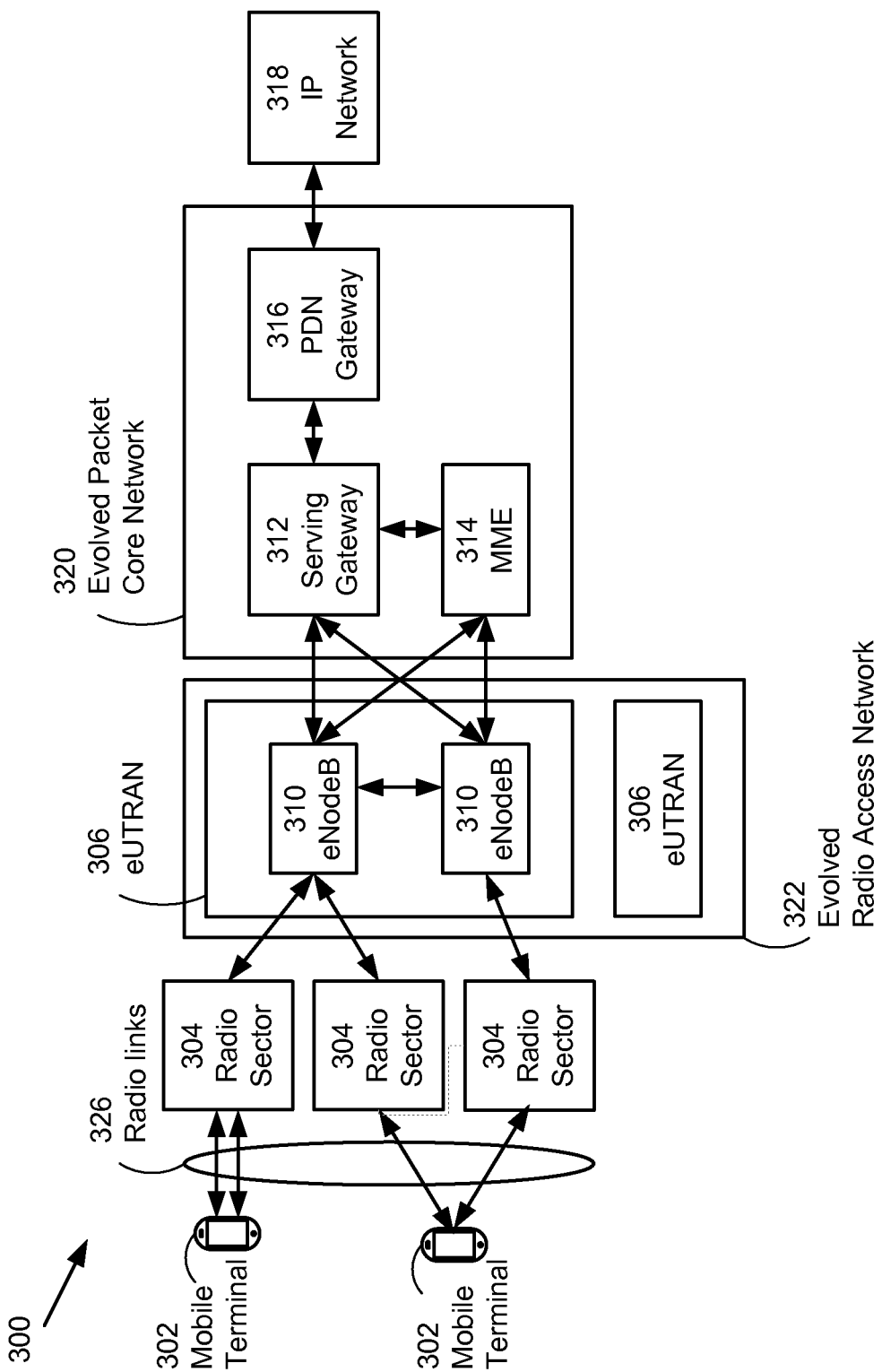
FIG. 3 illustrates components of an LTE (or LTE-Advanced) wireless communication network.

FIG. 3 illustrates a representative Long Term Evolution (LTE) wireless network 300 architecture designed as a packet switched network exclusively. A mobile terminal 302 can connect to an evolved radio access network 322 through radio links 326 associated with radio sectors 304 that emanate from evolved Node B's (eNodeB) 310. The eNodeB 310 includes the functions of both the transmitting and receiving base stations (such as the BTS 208 in the CDMA2000 1x wireless network 200) as well as the base station radio controllers (such as the BSC 210 in the CDMA2000 1x wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an evolved UTRAN (eUTRAN) 306. The eNodeB 310 can also be connected to a mobility management entity (MME) 314 that can provide control over connections for the mobile terminal 302.

Figure 4:
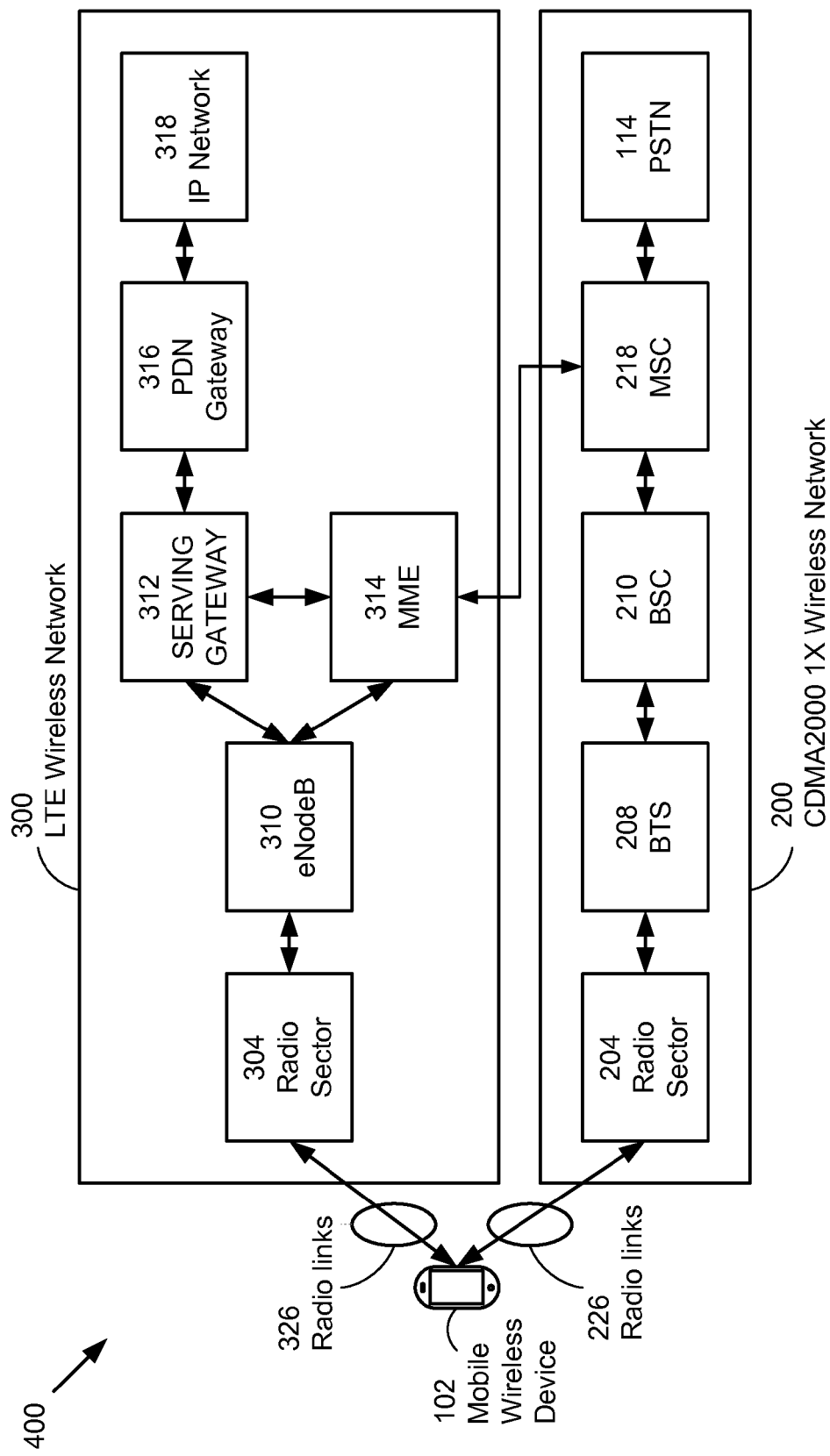
FIG. 4 illustrates a mobile wireless device communicating in parallel to the CDMA2000 1x (RTT or EV-DO) wireless communication network of FIG. 2 and the LTE (or LTE-Advanced) wireless communication network of FIG. 4.

FIG. 4 illustrates a mobile wireless device 102 in communication with both the LTE wireless network 300 and with the CDMA2000 1x wireless network 200. The CDMA2000 1x wireless network 200 can connect to the circuit switch based public switched telephone network (PSTN) 114 through a mobile switching center (MSC) 218. The MSC 218 of the CDMA2000 1x wireless network 200 can be interconnected to the MME 314 of the LTE wireless network 300 to coordinate call signaling for the mobile wireless device 102. In some embodiments, the CDMA2000 1x wireless network 200 can seek to establish a connection through the radio links 226 with the mobile wireless device 102, e.g. to establish a voice connection between the mobile wireless device 102 and the PSTN 114. The CDMA2000 1x wireless network 200 can transmit a page message to the mobile wireless device 102 using the radio links 226 to indicate the availability of an incoming voice connection. Unless a receiver in the mobile wireless device 102 is tuned to listen for the page message from the CDMA2000 1x wireless network 200 during the appropriate paging interval, the mobile wireless device 102 can be connected to the LTE wireless network 300 during the paging interval and can be unaware of the incoming voice connection. A dual chip mobile wireless device 102 can be connected to the LTE wireless network 300 and listen to the CDMA2000 1x wireless network 200 simultaneously, but a single chip mobile wireless device 102 with limited receive capabilities can be only capable of listening to one cellular wireless network at a time. As described herein, the single chip mobile wireless device 102 can periodically listen for page messages from the CDMA2000 1x wireless network while simultaneously maintaining at least a signaling connection to the LTE wireless network 300 to minimize signaling messages to the LTE wireless network 300. The LTE wireless network 300 can suspend radio resource allocations to the single chip mobile wireless device 102 during the page intervals in order to reuse the radio resources for other mobile wireless devices 102 in communication with the LTE wireless network 300.

Figure 5:
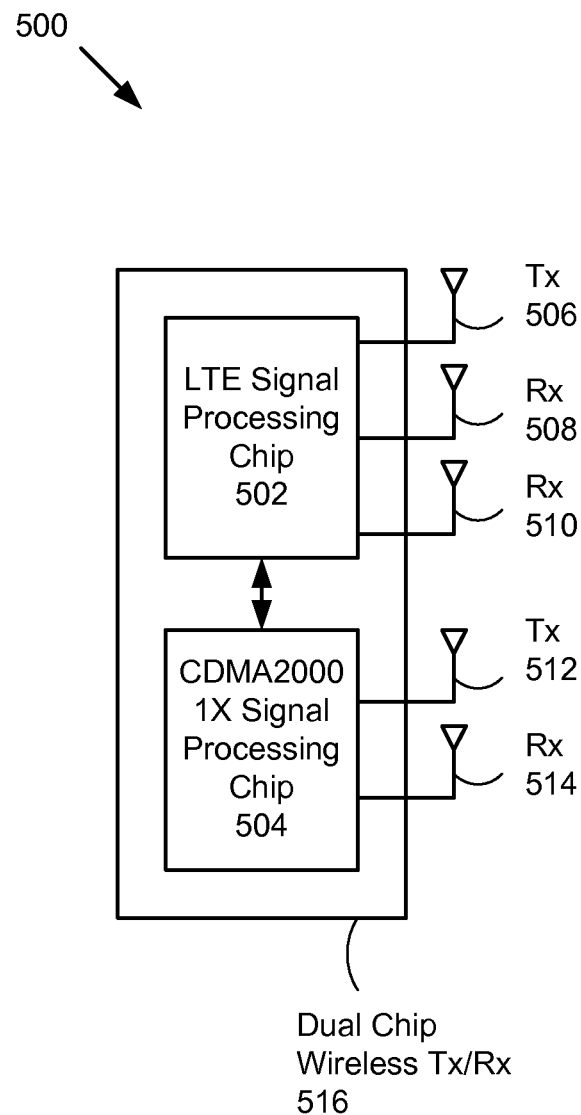
FIG. 5 illustrates elements of a prior art dual signal processing chip mobile wireless device.

FIG. 5 illustrates select wireless signal processing elements 500 that can be contained in a prior art dual chip wireless transmitter/receiver (TX/RX) 516 within a dual chip mobile wireless device 102. An LTE signal processing chip 502 can be used for connections between the dual chip mobile wireless device 102 and the LTE wireless network 300, while a CDMA2000 1x signal processing chip 504 can be used for connections between the dual chip mobile wireless device 102 and the CDMA2000 1x wireless network 200. Each signal processing chip can be connected to a set of antennas through which radio frequency signals can be transmitted and received with respective wireless networks. The LTE signal processing chip 502 can be connected to a transmitting antenna 506 and to a pair of receive antennas 508/510. Multiple receive antennas can be used to improve performance through various forms of receive diversity and can be required based on a standardized wireless communication protocol. With the separate CDMA2000 1x signal processing chip 504, the dual chip mobile wireless device 102 can transmit and receive radio frequency signals with the CDMA2000 1x wireless network 200 through a transmit antenna 512 and a receive antenna 514, while simultaneously transmitting and receiving radio frequency signals with the LTE wireless network 300 through the separate transmit antenna 506 and receive antennas 508/510. The LTE signal processing chip 502 and the CDMA2000 1x signal processing chip 504 can be connected to each other in order to coordinate radio frequency signal communication with their respective wireless networks. The dual chip wireless transmitter/receiver 516, while flexible, can be more expensive, consume more power and occupy more space than a compact, low power single chip wireless transmitter/receiver as shown in FIG. 6.

Figure 6:
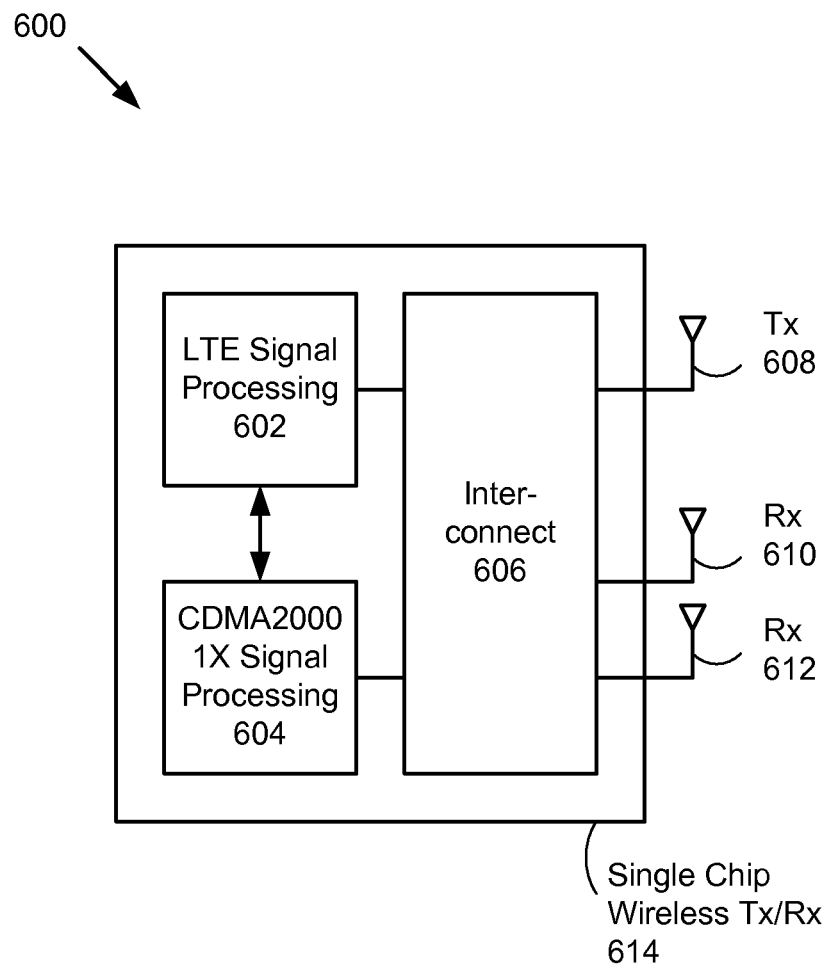
FIG. 6 illustrates elements of a representative single signal processing chip mobile wireless device.

FIG. 6 illustrates a single chip wireless transmitter/receiver 614 that can reside in a single chip wireless mobile wireless device 102 that can communicate with the LTE wireless network 300 or the CDMA2000 1x wireless network 200 separately but not simultaneously. When connected to the LTE wireless network 300, the single chip mobile wireless device 102 can use a single transmitter (Tx) 608 and dual receivers (Rx) 610/612. When connected to the CDMA2000 1x wireless network 200, the single chip mobile wireless device 102 can use the single transmitter 608 and either one receiver (Rx 610 or Rx 612) or dual receivers (Rx 610 and Rx 612). Use of dual receivers for both the LTE wireless network 300 and the CDMA2000 1x wireless network 200 can provide higher receive signal quality and therefore higher data throughput and/or greater connection reliability under adverse signal conditions. An interconnect block 606 can allow either an LTE signal processing 602 block or a CDMA2000 1x signal processing block 604 to transmit and receive radio signals through the transmitter 608 and one or both of the receivers 610/612 respectively. Within the single chip wireless mobile wireless device 102, the single chip wireless transmitter/receiver 614 can be connected to an application processor (not shown) that can perform "higher layer" functions such as establishing connections for applications and forming messages to be communicated with various wireless networks, while the single chip wireless transmitter/receiver 614 can perform "lower layer" functions such as ensuring integrity of transmitted and received radio frequency signals that carry messages for the application processor.

Figure 7:
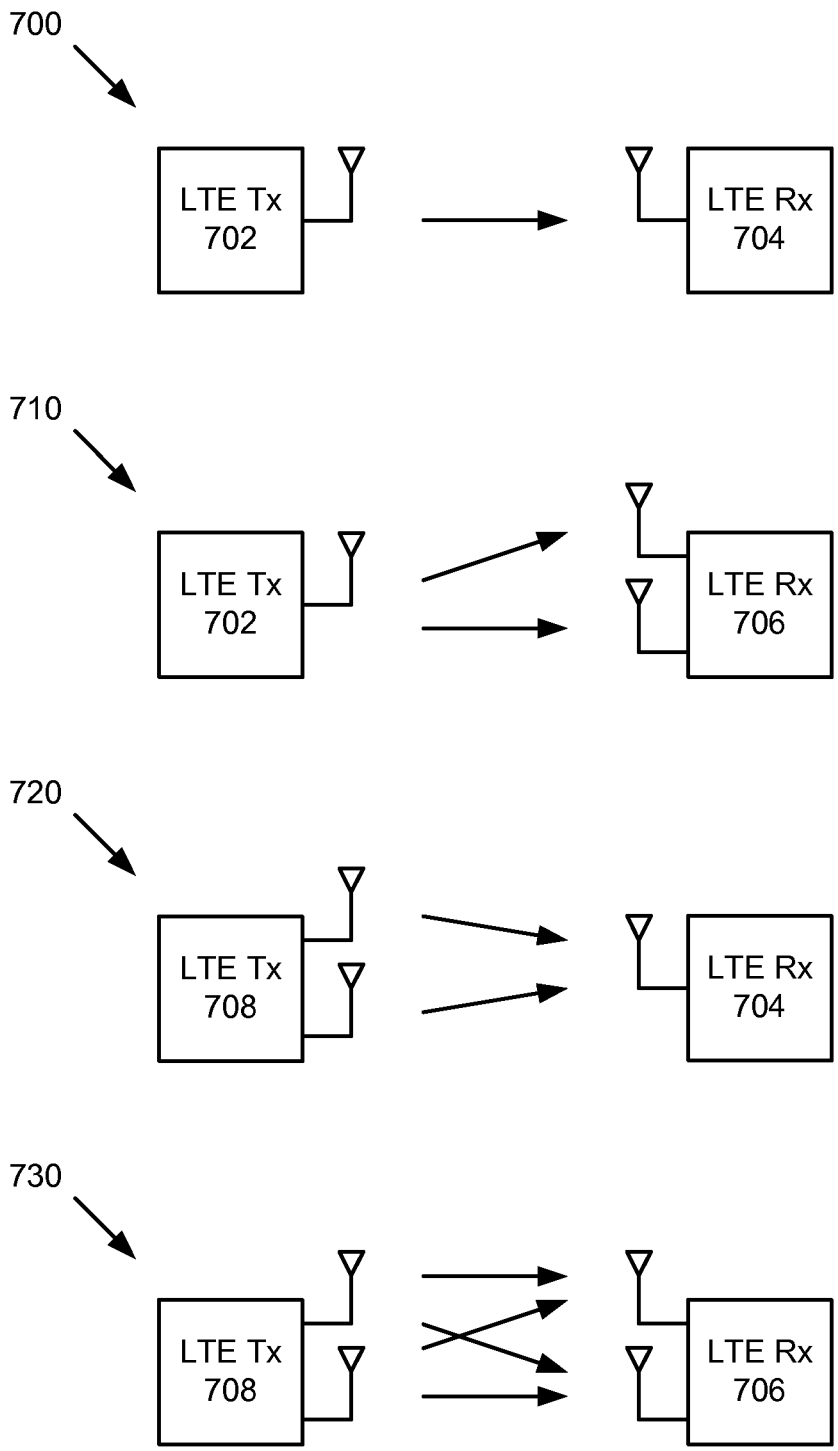
FIG. 7 illustrates several transmission modes using one or more antennas of the mobile wireless device.

FIG. 7 illustrates four different transmission and reception methods that can be used for communication of radio frequency signals between the mobile wireless device 102 and radio access networks 228/322 of wireless networks 200/300. Multiple transmit and/or receive antennas can be used for transmission signal path diversity to improve performance as well as for spatial multiplexing to increase throughput. A single transmitter, single receiver radio frequency channel 700 provides a basic form of communication with one transmitter 702 and one receiver 704 used at each end. A single transmitter, multiple receiver radio frequency channel 710 can provide receive diversity to improve receive signal strength by combining signals received from each of multiple parallel receive antennas at one end. As shown signals from the single transmitter 702 can be received by two different antennas 706. While only two receive antennas are shown in FIG. 7, more than two receive antennas can also be specified by wireless communication protocols and used in advanced mobile wireless devices. A multiple transmitter, single receiver radio frequency channel 720 can provide a form of transmit diversity by sending the same data (although possibly encoded differently) through each of multiple antennas. The single antenna receiver 704 can combine information received from each of the two transmit antennas 708 to improve receive signal performance. Finally, a multiple transmitter, multiple receiver radio frequency communication channel 730 can provide for a multiple input multiple output (MIMO) form of communication that can both improve receive signal performance and increase data rates. Parallel data streams can be transmitted by each of the multiple transmitting antennas, and the multiple receiving antennas can separate the received signals to reconstruct the parallel data streams. The use of multiple antennas (including both transmit and receive antennas) can be a critical requirement in advanced wireless communication protocols to increase robustness and achieve higher data transmission rates.

Figure 8:
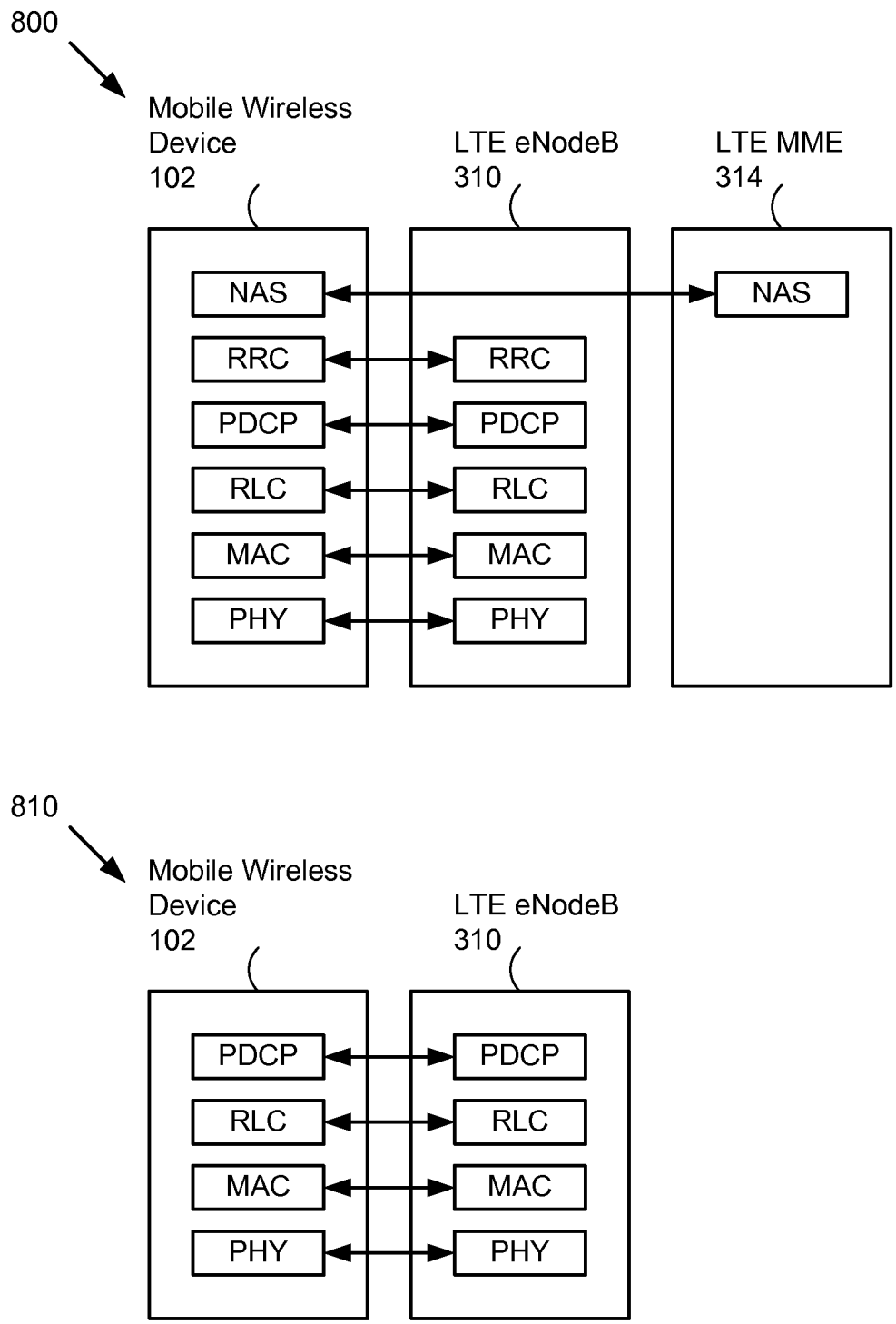
FIG. 8 illustrates representative protocol stacks between the mobile wireless device and the LTE (or LTE-Advanced) wireless network.

As illustrated in FIG. 8, the mobile wireless device 102 can connect to the LTE wireless network 300 using wireless communication protocol stacks 800/810 The user plane protocol stack 810 can include a physical layer (PHY) to ensure integrity of multiple "transport" channels over radio links 326 between the mobile wireless device 102 and the eNodeB 310 for the LTE wireless network 300. (Equivalent protocol stacks can also be used for the CDMA2000 1x wireless network 200.) The medium access control (MAC) layer can map multiple logical channels to the transport channels, while the radio link control (RLC) layer can format data and signaling messages for communication between the mobile wireless device 102 and the LTE wireless network 300. The packet data convergence protocol (PDCP) layer can control compression and encryption of data messages received from higher layers for communication through the LTE wireless network 300. The control plane protocol stack 800 can include the same layers as the user plane protocol stack 810 and additional layers including the radio resource control (RRC) layer to establish, maintain, share and disestablish radio resources for communication through the radio links 326. The RRC/PDCP/RLC/MAC/PHY protocol layers can form an "access stratum" that connects the mobile wireless device 102 with the eNodeB 310 of the LTE wireless network 300. The control plane protocol stack 800 can also include a higher layer "non-access stratum" (NAS) that can connect the mobile wireless device 102 with a mobility management entity (MME 314) in the LTE wireless network 300. The NAS layer can be used when associating the mobile wireless device 102 with the LTE wireless network 300 and for establishing and releasing bearer channels through the LTE wireless network 300.

Figure 9:
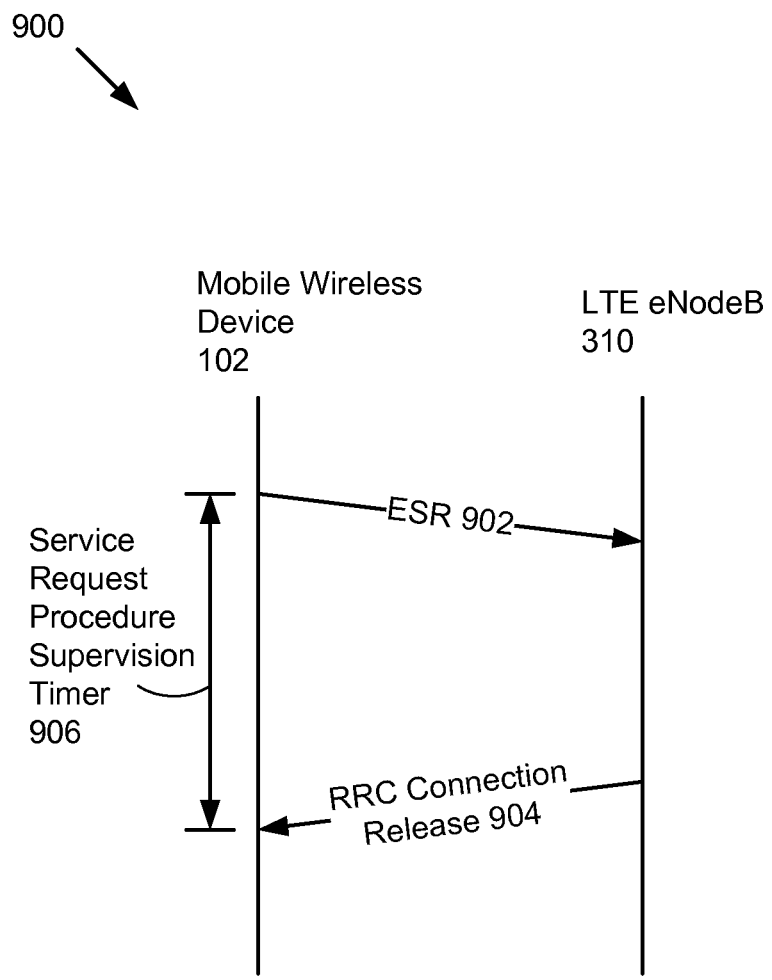
FIG. 9 illustrates a prior art extended service request exchange between the mobile wireless device and the LTE (or LTE-Advanced) wireless network.

FIG. 9 illustrates a prior art message exchange 900 between the mobile wireless device 102 and the eNodeB 310 of the LTE wireless network 300 to release a radio resource control (RRC) connection. When the mobile wireless device 102 intends to originate a voice connection with the CMDA2000 1x wireless network 200, the mobile wireless device can disconnect from the LTE wireless network 300 by sending an extended service request (ESR) message 902. The ESR message can be appropriate when the mobile wireless device 102 intends to tune its receiver away from the LTE wireless network 300 to the CDMA2000 1x wireless network 200 for a relatively long time period, such as during a voice connection. The LTE wireless network 300 can release the existing RRC connection and provide an indication of the release to the mobile wireless device 102 by sending an RRC connection release message 904. The release of the RRC connection can ensure an orderly termination of an existing connection with the LTE wireless network 300; however, when the mobile wireless device 102 intends to re-establish a connection with the LTE wireless network 300, a new RRC connection must be established. For brief and relatively frequent interruptions of connections with the LTE wireless network 300, such as when tuning a receiver from the LTE wireless network 300 to the CDMA2000 wireless network 200 to listen for a page addressed to the mobile wireless device 102 during regularly transmitted paging intervals, releasing the RRC connection and then re-establishing the RRC connection for each paging interval can unnecessarily add to signaling loads in the evolved radio access network 322 of the LTE wireless network 300.

In representative embodiments, the single chip mobile wireless device 102 can monitor paging messages from the CDMA2000 1x wireless network 200 without sending an ESR message 902 to the LTE wireless network 300 before tuning the receiver to listen for the paging messages during a paging interval on the CDMA2000 1x wireless network 200. In some embodiments, after receiving a paging messages that includes a page addressed to the single chip mobile wireless device 102 from the CDMA2000 1x wireless network 200, the single chip mobile wireless device 102 can transmit an ESR message 902 to the LTE wireless network 300 after receiving the page and before completing a connection to the CDMA2000 1x wireless network 200. In other embodiments, the single chip mobile wireless device 200 can transmit a suspension message to the LTE wireless network 300 rather than an ESR message 902 before tuning the receiver to listen for paging messages on the CDMA2000 1x wireless network 200. After receiving the suspension message, the LTE wireless network 300 can suspend allocation of radio resources in the access network until receiving a subsequent signaling message from the single chip mobile wireless device 102. The RRC connection can be maintained during a brief suspension period and can be released following a longer suspension period based on a timeout period. By suspending but not releasing the RRC connection for brief periods while tuning one or more receivers in the single chip mobile wireless device 102 between the LTE wireless network 300 and the CDMA2000 1x wireless network 200, the single chip mobile wireless device 102 can resume a connection to the LTE wireless network 300 without having to re-establish a new RRC connection to the LTE wireless network 300.

Figure 10:
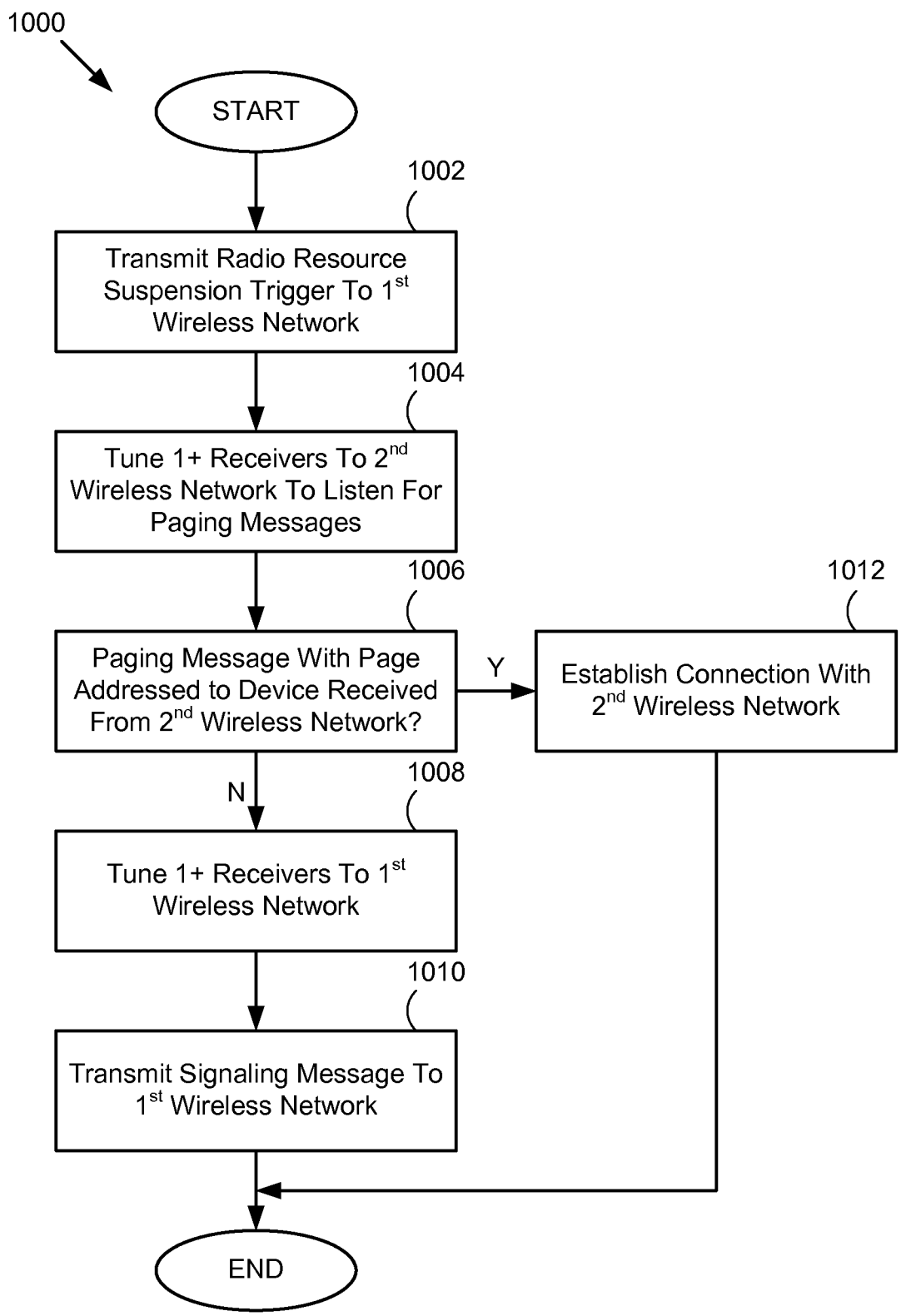
FIGS. 10, 11, 12 and 13 illustrate representative methods to manage radio resources between a mobile wireless device and a wireless network.

FIG. 10 illustrates a representative method 1000 to manage radio resources between a mobile wireless device 102 and a first wireless network when the mobile wireless device 102 is simultaneously associated with the first wireless network and registered with a second wireless network. In step 1002, the mobile wireless device 102 transmits a radio resource suspension trigger to the first wireless network. The radio resource suspension trigger can indicate to the first wireless network that the mobile wireless device 102 will tune its receiver to the second wireless network for a period of time during which no radio resources need be allocated to the mobile wireless device 102 by the first wireless network. The first wireless network can suspend allocation of radio resources to the mobile wireless device 102 until receiving an indication from the mobile wireless device 102 to resume allocation of radio resources. In an embodiment, the indication to resume radio resource allocation can be the reception of a signaling message from the mobile wireless device 102 by the first wireless network following the suspension. In step 1004, the mobile wireless device 102 tunes one or more receivers in the mobile wireless device 102 to the second wireless network in order to listen for paging messages transmitted during a paging interval. In step 1006, the mobile wireless device 102 determines if a paging message containing a page addressed to the mobile wireless device 102 has been received from the second wireless network during the paging interval. If a page addressed to the mobile wireless device 102 is received from the second wireless network during the paging interval in step 1006, then in step 1012, the mobile wireless device 102 establishes a connection with the second wireless network. If no paging message is received or if a paging message is received with a page addressed to a different device during the paging interval in step 1006, then in step 1008, the mobile wireless device 102 re-tunes the one or more receivers from the second wireless network back to the first wireless network. In step 1010, the mobile wireless device 102 transmits a signaling message to the first wireless network, thereby indicating to the first wireless network its readiness to resume transmission and reception with the first wireless network. In response to the signaling message, the first wireless network can resume allocations of radio resources to the mobile wireless device 102. No ESR message need be transmitted to cause the suspension of radio resource allocation to the mobile wireless device 102, and an RRC signaling connection between the mobile wireless device 102 and the first wireless network can remain in place during the suspension period.

In a representative embodiment, the first wireless network is an LTE wireless network 300 and the second wireless network is a CDMA2000 1x wireless network 200. The single chip mobile wireless device 102 transmits the suspension trigger to the LTE wireless network 300 before tuning a receiver away from the LTE wireless network 300 to the CDMA2000 1x wireless network 200 to listen for pages received from the CDMA2000 1x wireless network 200. The suspension trigger from the single chip mobile wireless device 102 can indicate to the LTE wireless network 300 that the single chip mobile wireless device 102 will tune away its receiver for a period of time. The transmitted suspension trigger can differ from the extended service request (ESR) message in that an RRC connection between the single chip mobile wireless device 102 and the LTE wireless network 300 can be suspended but not necessarily released. In one embodiment, the suspension trigger includes a predetermined set of values for a signaling message transmitted regularly to the LTE wireless network 300 by the single chip mobile wireless device 102. In representative embodiments, the suspension trigger can be a pre-defined combination of values for one or more of the channel quality information (CQI), the pre-coding matrix indicator (PMI) and the rank indicator (RI). Upon receipt of the suspension trigger, the LTE wireless network 300 suspends allocating radio resources in both the downlink and uplink directions to the single chip mobile wireless device 102. The radio resource control (RRC) connection between the LTE wireless network 300 and the single chip mobile wireless device 102 is maintained by the LTE wireless network 300 during the suspension (at least for a period of time). The LTE wireless network 300 suspends data transmission to the single chip mobile wireless device 102 and later resumes data transmission to the single chip mobile wireless device 102 without a loss of data packets in the downlink direction, thereby maintaining data transmission integrity. The radio resources can be assigned to other mobile wireless devices 102 by the LTE wireless network 300 during the suspension, thereby improving access network radio resource efficiency.

When no page addressed to the single chip mobile wireless device 102 is received by the single chip mobile wireless device 102 from the CDMA2000 1x wireless network 200 during the time period when its receiver is tuned to the CDMA2000 1x wireless network 200, the single chip mobile wireless device 102 returns to the LTE wireless network 300 (i.e. retunes its receiver back to the LTE wireless network 300). The interruption of the LTE connection can be relatively short, e.g. approximately 100 ms. After retuning its receiver back to the LTE wireless network 300, the single chip mobile wireless device 102 transmits a signaling message to the LTE wireless network 300 indicating (directly or indirectly) that its receiver has been retuned back to the LTE wireless network 300. The LTE wireless network 300 can then resume allocation of radio resources to the single chip mobile wireless device 102. Both the suspension trigger and the "resume" indication to the LTE wireless network 300 can use a regularly transmitted signaling message such as the CQI/PMI/RI message, and as such no extra signaling load can be required for the LTE wireless network 300 connections to realize the suspension and resumption of the LTE wireless network 300 connection with the single chip mobile wireless device 102.

When the single chip mobile wireless device 102 receives a page addressed to the single chip mobile wireless device 102 from the CDMA2000 1x wireless network 200 during the time period when its receiver is tuned to the CDMA2000 1x wireless network 200, the single chip mobile wireless device 102 establishes a mobile terminated connection to the CDMA2000 1x wireless network 200. The receiver in the single chip mobile wireless device 102 remains tuned to the CDMA2000 1x wireless network 200 while the CDMA2000 1x wireless network 200 connection remains active. For a sufficiently long connection to the CDMA2000 1x wireless network 200, the parallel RRC connection to the LTE wireless network 300 eventually times out. At the end of the connection to the CDMA2000 1x wireless network 200, the single chip mobile wireless device 102 tunes its receiver back to the LTE wireless network 300 and re-establishes an RRC connection to the LTE wireless network 300 in order to resume active data transfer with the LTE wireless network 300.

Figure 11:
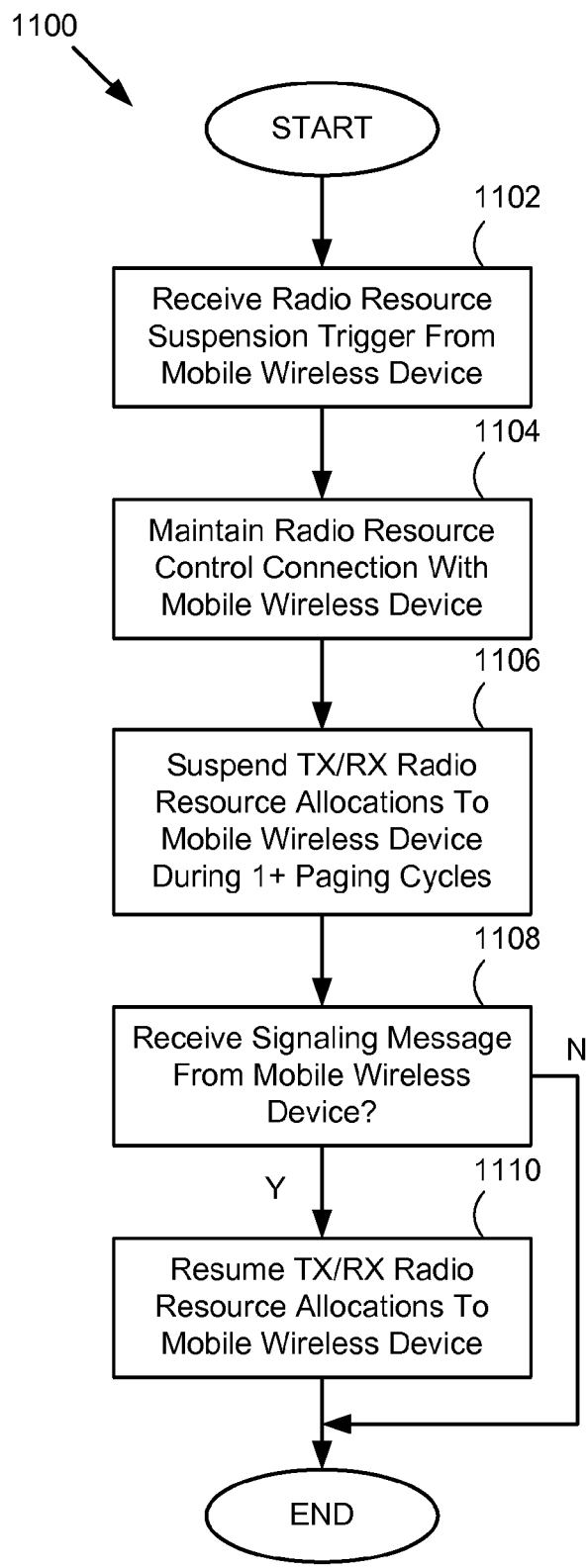

FIG. 11 illustrates another representative method 1100 to manage radio resources between the mobile wireless device 102 and the first wireless network. In step 1102, a radio access subsystem in the first wireless network receives a radio resource suspension trigger from the mobile wireless device 102. In step 1104, the radio access subsystem in the first wireless network maintains an existing radio resource control (RRC) connection between the first wireless network and the mobile wireless device 102. In step 1106, the radio access subsystem in the first wireless network suspends allocation of radio resources in both transmit and receive directions to the mobile wireless device 102 during one or more paging cycles of a second wireless network. In some embodiments, the first wireless network can be aware of specific time periods that correspond to paging cycles for the second wireless network, while in other embodiments, the first wireless network can be unaware of specific time periods for the paging cycles. The suspension of radio resource allocations to the mobile wireless device 102 continues until the radio access subsystem in step 1108 determines that a signaling message from the mobile wireless device 102 has been received. The signaling message indicates to the first wireless network that the mobile wireless device 102 is ready to resume transmission and reception through the suspended connection to the first wireless network. In step 1110, the first wireless network resumes allocation radio resources in transmit and receive directions to the mobile wireless device 102.

Figure 12:
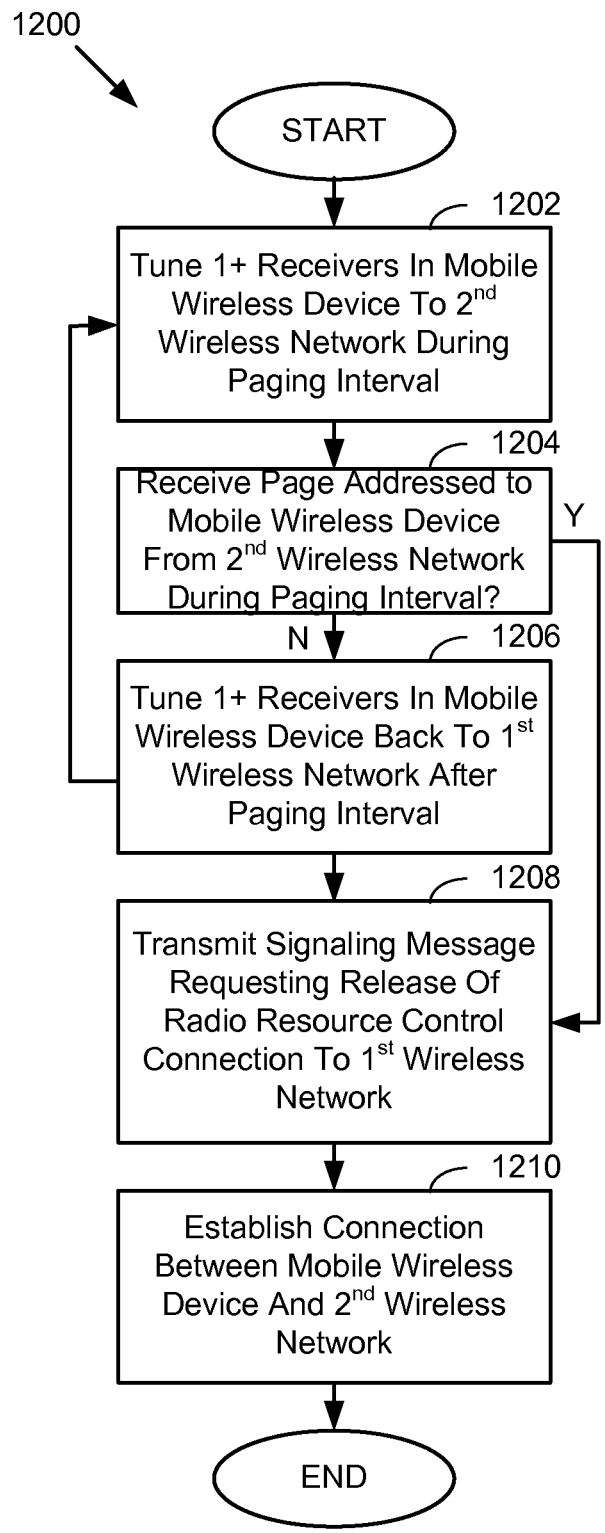

FIG. 12 illustrates another representative method to manage radio resources between the mobile wireless device 102 and a first wireless network. When the mobile wireless device is associated with the first wireless network and is simultaneously registered with a second wireless network, the mobile wireless device 102 in step 1202 tunes at least one receiver in the mobile wireless device 102 to the second wireless network during a paging interval of the second wireless network. In step 1204, the mobile wireless device 102 determines whether a page addressed to the mobile wireless device 102 is received during the paging interval. When a page addressed to the mobile wireless device 102 is received during the paging interval, the mobile wireless device in step 120 transmits a signaling message to the first wireless network that requests release of the radio resource control (RRC) connection between the mobile wireless device 102 and the first wireless network. A representative RRC release message is an ESR message. In step 1210, the mobile wireless device 102 establishes a connection between the mobile wireless device 102 and the second wireless network in response to the received page addressed to the mobile wireless device 102. The signaling message that requests release of the RRC connection can effectively release the previous connection between the mobile wireless device 102 and the first wireless network. When no page addressed to the mobile wireless device 102 is received during the paging interval, the mobile wireless device 102 in step 1206 re-tunes the one or more receivers back to the first wireless network after the paging interval. The cycle then repeats for the next paging interval, and thus the mobile wireless device 102 tunes the one or more receivers back and forth between a connection to the first wireless network and a "listening" mode during a paging interval to the second wireless network. The connection to the first wireless network is released only when a page addressed to the mobile wireless device 102 is received from the second wireless network during one of the paging intervals.

In a representative embodiment, the first and second wireless networks can be the LTE wireless network 300 and the CDMA2000 1x wireless network 200 respectively. When a connection with the LTE wireless network 300 is suspended, no radio resources can be allocated by the LTE wireless network 300 to the single chip mobile wireless device 102, and the single chip mobile wireless device 102 can listen for paging messages from the CDMA2000 1x wireless network 200 without losing data packets from the active connection with the LTE wireless network 300. During the CDMA2000 1x wireless network 200 paging time slot, the single chip mobile wireless device 102 cannot transmit messages on the LTE wireless network 300. If no page addressed to the mobile wireless device 102 is received from the CDMA2000 1x wireless network 200, the single chip mobile wireless device 102 can resume the data connection with the LTE wireless network 300 by sending a signaling message to the LTE wireless network 300. The LTE wireless network 300 can resume allocating radio resources to the single chip mobile wireless device 102 after receiving the signaling message.

Figure 13:
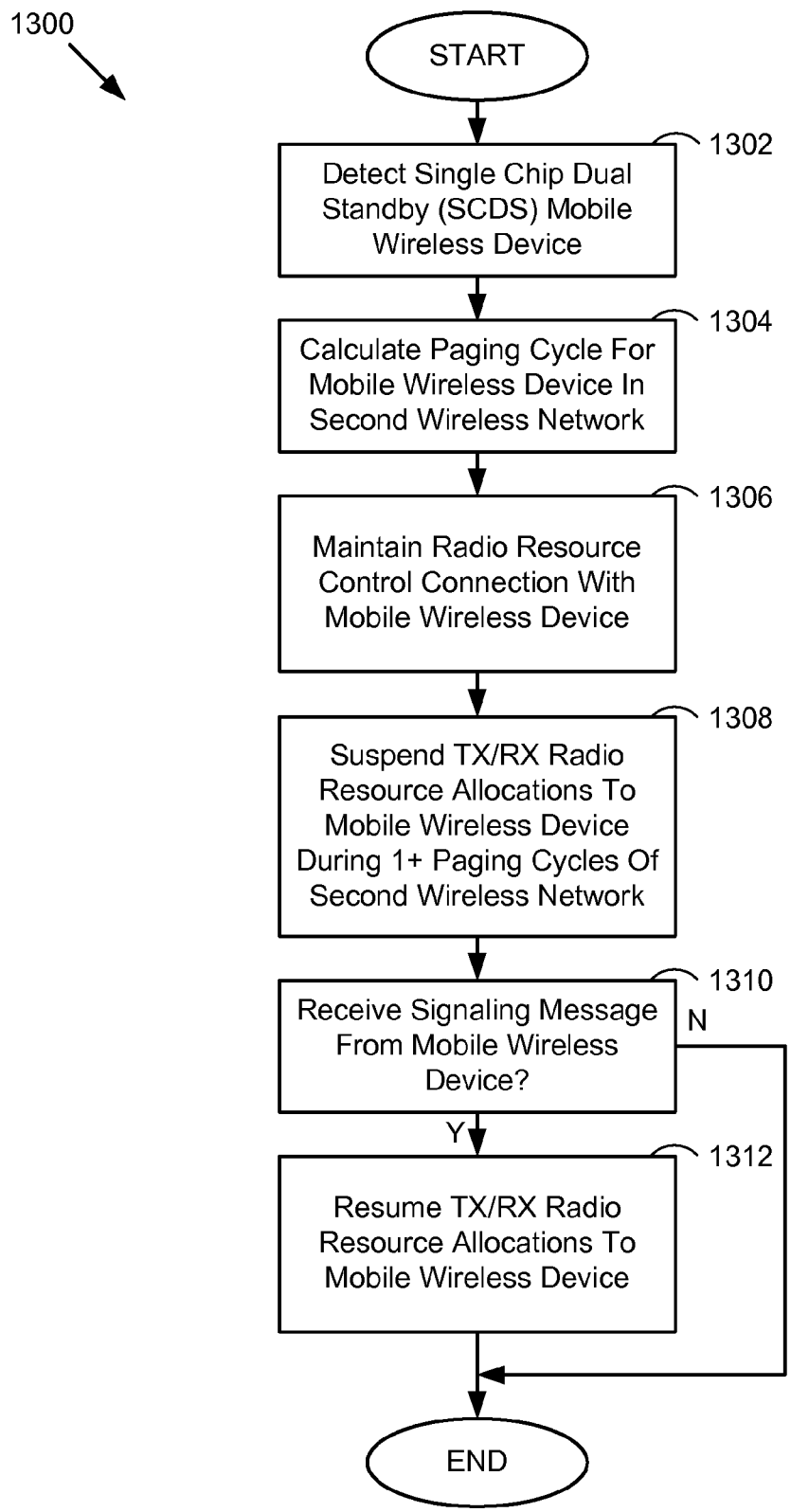

FIG. 13 illustrates another representative method to manage radio resources between a mobile wireless device 102 and a first wireless network when the mobile wireless device 102 is associated with the first wireless network and is simultaneously registered with a second wireless network. In step 1302, the first wireless network detects the mobile wireless device 102 is a single chip dual standby (SCDS) mobile wireless device. By detecting the mobile wireless device 102 is an SCDS device, other mobile wireless devices that are not SCDS devices operating in the same first wireless network can continue to be allocated radio resources, i.e. the suspension of radio resource allocation in the steps described further below can be applied only to SCDS devices. In representative embodiments, an SCDS mobile wireless device can indicate to the first wireless network that it is an SCDS mobile wireless device through a device capability indicator or through a feature bit; alternatively, the first wireless network can detect that the mobile wireless device 102 is an SCDS mobile wireless device by recognizing capabilities of the mobile wireless device 102 by a unique identifier for the mobile wireless device 102, such as an international mobile equipment identity (IMEI) or an international mobile subscriber identity (IMSI). In step 1304, the first wireless network calculates at least one paging cycle for the second wireless network. The first and second wireless networks can be interconnected directly or indirectly such that paging intervals for mobile wireless device 102 in the second wireless network can be determined by the first wireless network. The first wireless network, in step 1306, maintains a radio resource control (RRC) connection with the mobile wireless device 102. In step 1308, the first wireless network suspends radio resource allocations for both transmit and receive directions (uplink and downlink transmissions) during at least one paging cycle of the second wireless network. The RRC signaling connection between the mobile wireless device 102 and the first wireless network is maintained while radio resource allocations to the mobile wireless device 102 are suspended by the first wireless network. In step 1310, the first wireless network determines whether a signaling message is received from the mobile wireless device 102. When receiving a signaling message from the mobile wireless device 102, the first wireless network resumes allocation of radio resources for transmit and receive directions to the mobile wireless device 102 in step 1312. Until a signaling message is received from the mobile wireless device 102, no resource allocations to the mobile wireless device 102 occur. When no signaling message is received by the first wireless network, eventually a timer for the RRC connection expires, and the first wireless network drops the RRC connection with the mobile wireless device 102. When the RRC connection has dropped, after the mobile wireless device 102 re-tunes its receiver from the second wireless network back to the first wireless network, an RRC connection to the first wireless network needs to be re-established.

In a representative embodiment, the first wireless network and the second wireless network can be the LTE wireless network 300 and the CMDA2000 1x wireless network respectively. The single chip mobile wireless device 102 can be connected to (or camped on) the LTE wireless network 300, which can be synchronized to a common time reference as the CDMA2000 1x wireless network 200. The single chip mobile wireless device 102 can also be registered simultaneously with the CDMA2000 1x wireless network 200. A representative common time reference can be based on a global positioning system (GPS) time reference. System clocks within the LTE wireless network 300 and the CDMA2000 1x wireless network 200 can both use the same GPS time reference, and both the LTE wireless network 300 and the CDMA2000 1x wireless network 200 can use the system time and the international mobile equipment identity (IMEI) or the international mobile subscriber identity (IMSI) of the single chip mobile wireless device 102 to calculate paging time slots and paging time intervals for the single chip mobile wireless device 102. Using the paging time slot and paging time interval calculations, the LTE wireless network 300 can know when a single chip mobile wireless device 102 can tune away to listen for paging messages from the CDMA2000 1x wireless network 200. The LTE wireless network 300 can suspend an active data connection to the single chip mobile wireless device 102 by not allocating radio resources to the single chip mobile wireless device 102 during the CDMA2000 1x wireless network 200 paging time slots for the single chip mobile wireless device 102. With timing of the LTE wireless network 300 and the CDMA2000 1x wireless network 200 synchronized to a common time reference, no suspension trigger from the single chip mobile wireless device 102 is needed, as the LTE wireless network 300 can determine the timing of the CDMA2000 1x wireless network 200 paging time slots for the single chip mobile wireless device 102.

Figure 14:
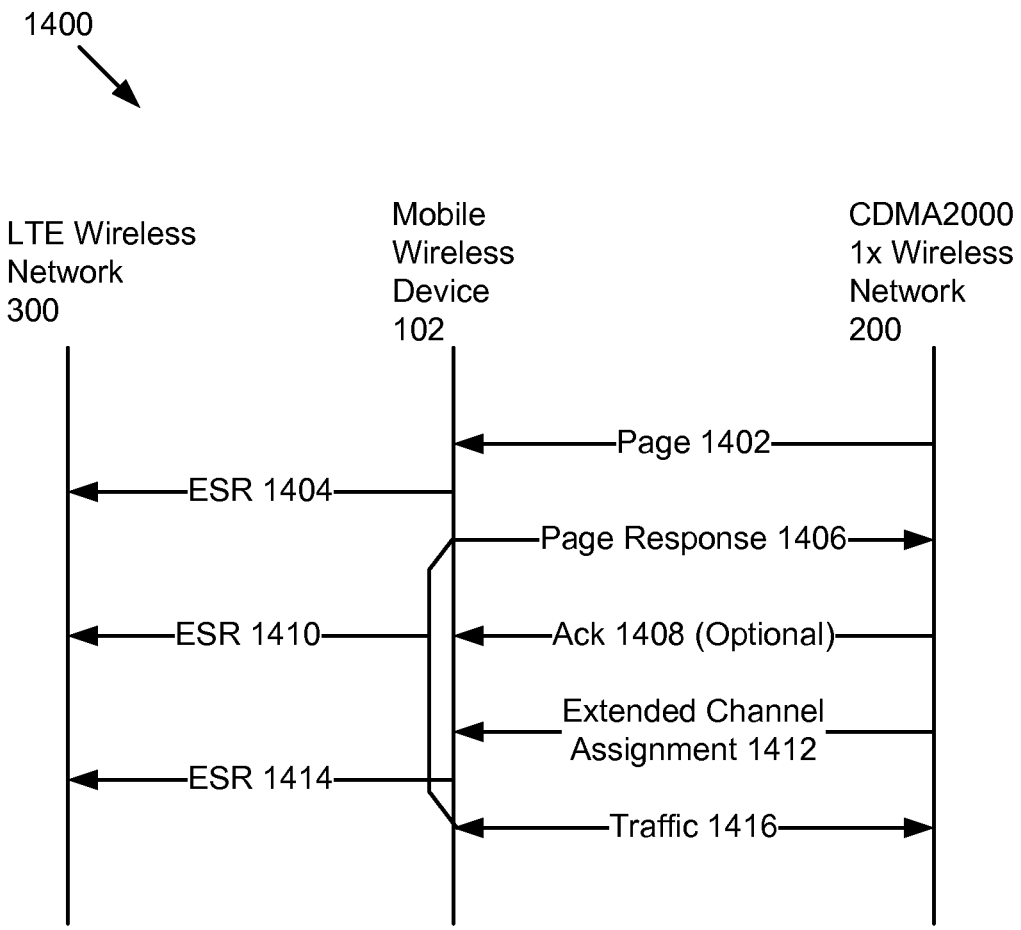
FIG. 14 illustrates options for the use of an extended service request message with a representative method to manage radio resources between the mobile wireless device and the wireless network.

FIG. 14 illustrates a signaling message exchange 1400 between the mobile wireless device 102 and the CDMA2000 1x wireless network 200 as well as the LTE wireless network 300 when a page 1402 addressed to the mobile wireless device 102 is received by the mobile wireless device 102 while listening to the CDMA2000 1x wireless network 200 during a paging time interval. Following receipt of the page 1402 addressed to the mobile wireless device 102, the mobile wireless device 102 can send an ESR message to the LTE wireless network 300 during one of three different time periods. The first time period occurs after receiving the page 1402 from the CDMA2000 1x wireless network 200 and before sending a page response 1406 back to the CDMA2000 1x wireless network 200. The second time period occurs after sending the page response 1406 to the CDMA2000 1x wireless network 200 and before receiving an optional acknowledgement (Ack 1408) or an extended channel assignment 1412 message from the CDMA2000 1x wireless network 200. The third time period occurs after receiving the optional acknowledgement (Ack 1408) or an extended channel assignment 1412 message from the CDMA2000 1x wireless network 200 and before an active connection with traffic 1416 with the CDMA2000 1x wireless network 200. The ESR message can be sent to the LTE wireless network 300 during one of the three time periods. The transmission of the ESR message to the LTE wireless network 300 can be realized as a "best effort" transmission in that the single chip mobile wireless device 102 can choose not to wait for acknowledgement from the LTE wireless network 300 in response to the transmitted ESR message. (No acknowledgement from the LTE wireless network 300 to the mobile wireless device 102 is shown in FIG. 14). With "best effort" transmission, the single chip mobile wireless device 102 can assume that the transmitted ESR message is received properly by the LTE wireless network 300. By not waiting for an acknowledgement from the LTE wireless network 300, the single chip mobile wireless device 102 can proceed to establish the mobile terminated call to the CDMA2000 1x wireless network 200 with minimal delay.

In one embodiment shown in FIG. 14, after receiving the page 1402 addressed to the mobile wireless device 102 from the CDMA2000 1x wireless network 200, the mobile wireless device 102 can tune the one or more receivers back to the LTE wireless network 300 and send an ESR message 1404 to the LTE wireless network 300 and subsequently send a page response 1406 to the CDMA2000 1x wireless network 200. After sending the ESR 1404 message to the LTE wireless network 300, the mobile wireless device 102 can tune the one or more receivers back to the CDMA2000 1x wireless network 200 without waiting for an acknowledgement of the ESR 1404 message from the LTE wireless network 300. The mobile wireless device 102 can send the page response 1406 to the CDMA2000 1x wireless network 200 and complete establishment of a connection between the mobile wireless device 102 and the CDMA2000 1x wireless network after sending the ESR 1404 to the LTE wireless network 300.

In another embodiment illustrated in FIG. 14, the mobile wireless device 102 responds to the page 1402 addressed to the mobile wireless device 102 from the CDMA2000 1x wireless network 200 with the page response 1406 and then re-tunes one or more receivers in the mobile wireless device 102 from the CDMA2000 1x wireless network 200 back to the LTE wireless network 200 to send an ESR message 1410 to the LTE wireless network 300. The mobile wireless device 102 can simultaneously keep one receiver listening to the CDMA2000 1x wireless network 200 for an optional acknowledgement 1408 message and for an extended channel assignment message 1412 from the CDMA2000 1x wireless network 200 before exchanging traffic 1416 with the CDMA2000 1x wireless network 200. By sending the page response 1406 to the CDMA2000 1x wireless network 200 before sending the ESR 1410 message to the LTE wireless network 300, establishment of the connection between the mobile wireless device 102 and the CDMA2000 1x wireless network 200 can proceed without delay.

In a further embodiment illustrated in FIG. 14, the mobile wireless device 200 can wait to send an ESR message 1414 to the LTE wireless network 200 until after receiving the extended channel assignment message 1412 from the CDMA2000 1x wireless network 200 but before traffic 1414 with the CDMA2000 1x wireless network 200 starts. In choosing between each of the embodiments described above that differ by when the ESR message is sent, the mobile wireless device 102 can trade off between an earlier response to the LTE wireless network 300 that can free up radio resources for the LTE wireless network 300 sooner and a more rapid response to the CDMA2000 1x wireless network 200 to speed establishing a connection with the CDMA2000 1x wireless network 200.

In some embodiments, the LTE wireless network 300 can suspend radio resource allocation to a single chip mobile wireless device 200 based on knowledge of one or more features of the single chip mobile wireless device 102. The single chip mobile wireless device 102 can indicate one or more of its features by transmitting to the LTE wireless network 300 a device capability indicator and/or one or more feature bits in a pre-determined message, such as during power up and/or registration of the mobile wireless device 102 with the LTE wireless network 300. The LTE wireless network 300 can also determine features of the single chip mobile wireless device based 102 on knowledge of the device's unique international mobile equipment identity (IMEI), which can also be communicated at power up and/or registration. The LTE wireless network 300 can target suspension of LTE wireless network 300 connections for select single chip mobile wireless devices 102 while allowing continuous connections for other mobile wireless devices 102 that are not single chip mobile wireless device 102, such as for dual chip mobile wireless devices.

In an embodiment, the single chip mobile wireless device 102 can use one transmit path and one receive path for a connection with the LTE wireless network 300 and simultaneously listen for paging messages on the CDMA2000 1x wireless network 300 through a separate receive path. This mode of operation of the single chip mobile wireless device 102 can be referred to as a "no RX diversity" mode. A single receive path mode can have lower receive signal quality than a dual receive path mode; however, the signal quality can be sufficient in some circumstances to maintain a connection with the LTE wireless network 300. In some embodiments, the single chip mobile wireless device 102 can indicate to the LTE wireless network 300 use of a "no RX diversity" mode by sending a pre-determined combination of values of the CQI/PMI/RI to the LTE wireless network 300. In other embodiments, the single chip mobile wireless device 102 cannot indicate to the LTE wireless network 300 explicitly of use of a "no RX diversity" mode, although the channel signal quality indicated in any CQI sent to the LTE wireless network 300 when using only a single receiver can be less than when using a dual receiver.

The LTE wireless network 300 can suspend allocating radio resources for an active data connection to the single receive path mobile wireless device when the LTE wireless network 300 detects an "out of sync" condition. An "out of sync" condition can be declared when no data can be received and correctly decoded from the single chip mobile wireless device 102 for a pre-determined period of time. The "out of sync" condition can be triggered by an uplink data outage for a relatively short period of time (e.g. shorter than the period of time for a loss of RRC connection). The LTE wireless network 300 can resume allocation of radio resources to the single chip mobile wireless device 102 upon reception of a correctly decoded signaling message (or data message) in the uplink direction. When the connection between the LTE wireless network 300 and the single chip mobile wireless device 102 remains out of sync for an extended period of time, then the LTE wireless network 300 can release the RRC connection based on a pre-determined time out period. Minimal data loss can occur during short periodic interruptions of an active connection between the LTE wireless network 300 and the single chip mobile wireless device 102 if the LTE wireless network 300 suspends radio resource allocation quickly upon detecting an "out of sync" condition. The single chip mobile wireless device 102 can listen for paging messages from the CDMA2000 1x wireless network 200 and return to the LTE wireless network 300 in short order if no page addressed to the single chip mobile wireless device 102 is received. The RRC connection to the LTE wireless network 300 can remain up and need not be re-established when listening for the pages during the periodic paging intervals on the CDMA2000 1x wireless network 200. If a page addressed to the single chip mobile wireless device 102 is received from the CDMA2000 1x wireless network 200, then the single chip mobile wireless device 102 can form a mobile terminated connection with the CDMA2000 1x wireless network 200. This connection between the CDMA2000 1x wireless network 200 and the single chip mobile wireless device 102 can result in an extended out of sync condition leading to an RRC connection release by the LTE wireless network 300.

In some embodiments, the single chip mobile wireless device 102 can elect to not send an ESR message to the LTE wireless network 300 to release the RRC connection to the LTE wireless network 300. Instead the RRC connection can be released by the LTE wireless network 300 following a time out period due to inactivity when the single chip mobile wireless device 102 is connected to the CDMA2000 1x wireless network 200.

Various aspects of the described embodiments can be implemented by software, hardware or a combination of hardware and software. The described embodiments can also be encoded as computer program code on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to manage radio resources between a mobile wireless device and a first wireless network, the method comprising the mobile wireless device:
    when the mobile wireless device is associated with the first wireless network through an established radio resource control connection and is simultaneously registered with a second wireless network, transmitting a radio resource suspension trigger to the first wireless network, while maintaining the established radio resource control connection;
    after transmitting the radio resource suspension trigger to the first wireless network, tuning one or more receivers in the mobile wireless device to listen for paging messages from the second wireless network during a paging interval;
    when receiving a paging message that includes a page addressed to the mobile wireless device from the second wireless network, establishing a connection with the second wireless network; and
    when receiving no paging message from the second wireless network and when receiving a paging message that does not include a page addressed to the mobile wireless device from the second wireless network, tuning the one or more receivers in the mobile wireless device back to the first wireless network and subsequently transmitting a signaling message to the first wireless network through the established radio resource control connection.

2. The method as recited in claim 1, wherein the first wireless network suspends all transmit and receive radio resource allocations to the mobile wireless device after receiving the radio resource suspension trigger and continuing until receiving the subsequently transmitted signaling message from the mobile wireless device, while maintaining the established radio resource control connection with the mobile wireless device.

3. The method as recited in claim 1, wherein the radio resource suspension trigger is a pre-defined combination of values for a signaling message transmitted regularly from the mobile wireless device to the first wireless network.

4. The method as recited in claim 1, wherein the radio resource suspension trigger is a signaling message that includes a predefined combination of values for a channel quality indicator, a precoding matrix indicator and a rank indicator.

5. The method as recited in claim 1, wherein the first wireless network operates according to a Third Generation Partnership Project (3GPP) Long Term Evolution (LTE) or later generation wireless communication protocol, and the second wireless network operates according to a Third Generation Partnership Project 2 (3GPP2) CDMA2000 1x wireless communication protocol.

6. A method to manage radio resources between a mobile wireless device and a first wireless network, the method comprising a radio access subsystem in the first wireless network:
    when the mobile wireless device is associated with the first wireless network through an established radio resource control connection and simultaneously registered with a second wireless network, receiving a radio resource suspension trigger from the mobile wireless device;
    after receiving the radio resource suspension trigger, maintaining the established radio resource control connection and suspending all transmit and receive radio resource allocations to the mobile wireless device during at least one paging cycle of the second wireless network; and
    after receiving a subsequent signaling message from the mobile wireless device through the established radio resource control connection, resuming transmit and receive radio resource allocations to the mobile wireless device.

7. The method as recited in claim 6, wherein the radio resource suspension trigger is a pre-defined combination of values for a signaling message transmitted regularly from the mobile wireless device to the first wireless network.

8. The method as recited in claim 6, wherein the radio resource suspension trigger is a signaling message that includes a predefined combination of values for a channel quality indicator, a precoding matrix indicator and a rank indicator.

9. The method as recited in claim 8, wherein the first wireless network operates according to a Third Generation Partnership Project (3GPP) Long Term Evolution (LTE) or later generation wireless communication protocol, and the second wireless network operates according to a Third Generation Partnership Project 2 (3GPP2) CDMA2000 1x wireless communication protocol.

10. A method to manage radio resources between a mobile wireless device and a first wireless network, the method comprising a radio access subsystem in the first wireless network:
    when the mobile wireless device is associated with the first wireless network through an established radio resource control connection and registered with a second wireless network, detecting the mobile wireless device is a single chip dual standby mobile wireless device;

calculating a paging cycle for the mobile wireless device in the second wireless network;

during at least one paging cycle for the mobile wireless device in the second wireless network, maintaining the established radio resource control connection and suspending all transmit and receive radio resource allocations to the mobile wireless device; and after receiving a subsequent signaling message from the mobile wireless device through the established radio resource control connection, resuming transmit and receive radio resource allocations to the mobile wireless device.

11. The method as recited in claim 10, further comprising the radio access subsystem in the first wireless network calculating the paging cycle for the mobile wireless device in the second wireless network using a local time reference, wherein the first wireless network and the second wireless network are synchronized to a common time reference.

12. The method as recited in claim 10, wherein the radio access subsystem detects the mobile wireless device is a single chip dual standby mobile wireless device based on a unique international mobile equipment identifier (IMEI) of the mobile wireless device.

13. A method to manage radio resources between a mobile wireless device and a first wireless network, the method comprising the mobile wireless device:

when the mobile wireless device is associated with the first wireless network through an established radio resource control connection and is simultaneously registered with a second wireless network, tuning one or more receivers in the mobile wireless device to listen for a page addressed to the mobile wireless device from the second wireless network during a paging interval;

when not receiving the page addressed to the mobile wireless device from the second wireless network, tuning the one or more receivers in the mobile wireless device to the first wireless network until a subsequent paging interval; and when receiving the page addressed to the mobile wireless device from the second wireless network, transmitting a signaling message to the first wireless network that requests releasing the radio resource control connection, and subsequently establishing a connection with the second wireless network.

14. The method as recited in claim 13, further comprising the mobile wireless device:

after receiving the page addressed to the mobile wireless device from the second wireless network, tuning the one or more receivers to the first wireless network before transmitting the signaling message that requests releasing the radio resource control connection to the first wireless network; and subsequently tuning the one or more receivers to the second wireless network and transmitting a response to the received page addressed to the mobile wireless device from the second wireless network.

15. The method as recited in claim 13, further comprising the mobile wireless device:

after receiving the page addressed to the mobile wireless device from the second wireless network, transmitting a response to the received page to the second wireless network; and subsequently tuning the one or more receivers to the first wireless network and transmitting the signaling message that requests releasing the radio resource control connection to the first wireless network.

16. The method as recited in claim 13, further comprising the mobile wireless device:

after receiving the page addressed to the mobile wireless device from the second wireless network, transmitting a response to the received page to the second wireless network; and after receiving a subsequent signaling message from the second wireless network, tuning the one or more receivers to the first wireless network and transmitting the signaling message that requests releasing the radio resource control connection to the first wireless network.

17. The method as recited in claim 16, wherein the subsequent signaling message from the second wireless network is a page response message or an extended channel assignment message.

18. The method as recited in claim 13, wherein the first wireless network operates according to a Third Generation Partnership Project (3GPP) Long Term Evolution (LTE) or later generation wireless communication protocol, and the second wireless network operates according to a Third Generation Partnership Project 2 (3GPP2) CDMA2000 1x wireless communication protocol.

19. A mobile wireless device comprising:

an application processor configured to control establishing and releasing connections between the mobile wireless device and one or more wireless networks;

a transmitter configured to transmit signals to a first wireless network according to a first wireless communication protocol and to a second wireless network according to a second wireless communication protocol; and one or more receivers configured to receive signals from the first and second wireless networks;

wherein the application processor is further configured to:
maintain an established radio resource control connection when the transmitter transmits a radio resource suspension trigger to the first wireless network and at least one receiver tunes to a second wireless network to listen for a page addressed to the mobile wireless device during a paging interval;

establish a connection with the second wireless network, when receiving the page addressed to the mobile wireless device from the second wireless network during the paging interval; and send a signaling message to the first wireless network through the established radio resource control connection after the at least one receiver tunes back to the first wireless network, when not receiving the page addressed to the mobile wireless device from the second wireless network during the paging interval.

20. The mobile wireless device as recited in claim 19, wherein the radio resource suspension trigger is a signaling message that includes a predefined combination of values for a channel quality indicator, a precoding matrix indicator and a rank indicator.

21. The mobile wireless device as recited in claim 19, wherein the first wireless network operates according to a Third Generation Partnership Project (3GPP) Long Term Evolution (LTE) or later generation wireless communication protocol, and the second wireless network operates according to a Third Generation Partnership Project 2 (3GPP2) CDMA2000 1x wireless communication protocol.

22. A computer program product encoded as computer program code in a non-transitory computer readable medium for managing radio resources between a mobile wireless device and a first wireless network, the computer program product comprising:

computer program code for maintaining an established radio resource control connection with the first wireless network when listening for a page addressed to the mobile wireless device from a second wireless network during a paging interval;

computer program code for tuning one or more receivers in the mobile wireless device to listen for the page addressed to the mobile wireless device from the second wireless network during the paging interval;

computer program code for tuning the one or more receivers in the mobile wireless device to the first wireless network when not receiving the page addressed to the mobile wireless device from the second wireless network during the paging interval until a subsequent paging interval; and computer program code for transmitting a signaling message that requests release of the radio resource control connection to the first wireless network after receiving the page addressed to the mobile wireless device from the second wireless network and before establishing a connection with the second wireless network.

23. The computer program product as recited in claim 22, further comprising:

computer program code for tuning the one or more receivers in the mobile wireless device to the first wireless network to transmit the signaling message that requests release of the radio resource control connection; and computer program code for subsequently tuning the one or more receivers in the mobile wireless device to the second wireless network to transmit a response to the received page addressed to the mobile wireless device from the second wireless network.

24. The computer program product as recited in claim 22, further comprising:

computer program code for transmitting a response to the received page addressed to the mobile wireless device to the second wireless network; and computer program code for subsequently tuning the one or more receivers to the first wireless network to transmit the signaling message that requests release of the radio resource control connection to the first wireless network.

25. The computer program product as recited in claim 22, further comprising:

computer program code for transmitting a response to the received page addressed to the mobile wireless device to the second wireless network;

computer program code for receiving a subsequent signaling message from the second wireless network; and computer program code for subsequently tuning the one or more receivers to the first wireless network to transmit the signaling message that requests release of the radio resource control connection to the first wireless network.

\* \* \* \* \*